United States Patent [19]

Long et al.

[11] 4,389,993
[45] Jun. 28, 1983

[54] ELECTRONIC IGNITION SYSTEM

[75] Inventors: Emile D. Long; Keith C. Richardson, both of Elmira, N.Y.

[73] Assignee: Allied Corporation, Morris Township, Morris County, N.J.

[21] Appl. No.: 158,439

[22] Filed: Jun. 11, 1980

Related U.S. Application Data

[63] Continuation of Ser. No. 889,996, Mar. 24, 1978, abandoned.

[51] Int. Cl.³ .............................. F02P 5/04; F02B 3/00; G06F 7/38
[52] U.S. Cl. .................................. 123/421; 123/406; 123/424
[58] Field of Search ................... 123/406, 424, 421

[56] References Cited

U.S. PATENT DOCUMENTS

| | | | |
|---|---|---|---|
| 4,022,170 | 5/1977 | Crall et al. | 123/421 |
| 4,127,091 | 11/1978 | Leichle | 123/421 |
| 4,178,893 | 12/1979 | Aoki | 123/421 |

Primary Examiner—Raymond A. Nelli
Attorney, Agent, or Firm—Robert H. Johnson; Roger H. Criss; Joel I. Rosenblatt

[57] ABSTRACT

A system for controlling the timing of an internal combustion engine having a rotatable power shaft including a timing mechanism coupled to an advance mechanism which produces a recurring ignition pulse. The timing mechanism produces a timing signal that recurs at a timing rate proportional to the rotational speed of the power shaft. The ignition pulse, which is initiated by the timing signal to establish the degree of spark advancement, is varied in response to an engine operating parameter, such as engine temperature to control spark advancement, and thereby reduce exhaust emissions.

33 Claims, 13 Drawing Figures

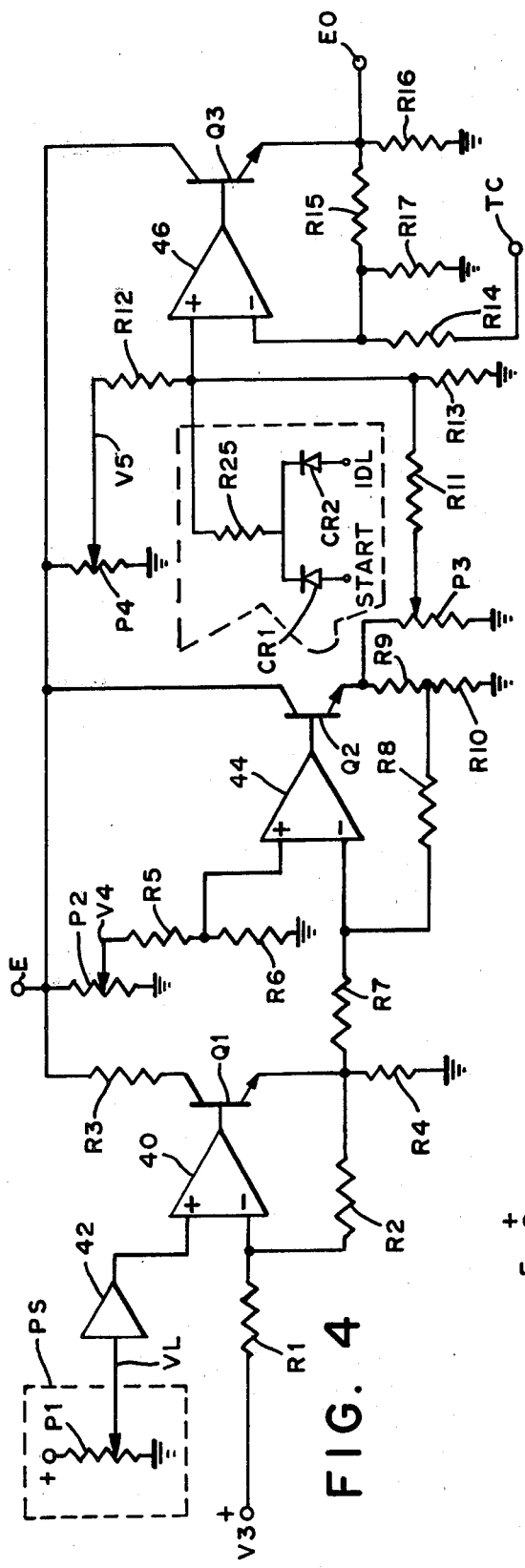
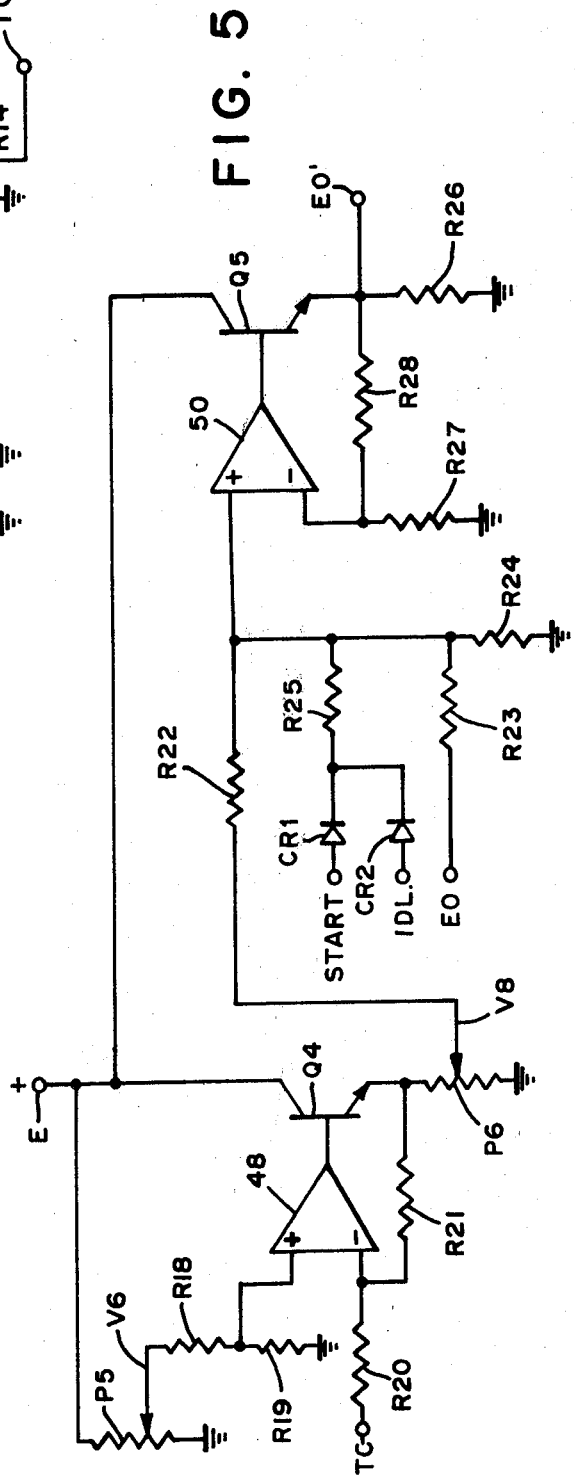
FIG. 4
FIG. 5

ELECTRONIC IGNITION SYSTEM

This is a continuation of application Ser. No. 889,996, filed Mar. 24, 1978 now abandoned.

BACKGROUND OF THE INVENTION

1. Field of the Invention

The invention relates to an electronic spark advance control system which times the occurrence of an ignition spark in an internal combustion engine equipped with a precision fuel metering system.

2. Prior Art

Historically the spark used to ignite the air-fuel mixture in the chamber of an internal combustion engine was controlled mechanically. These mechanical devices included an engine driven, multi-lobed cam mounted on a distributor shaft which alternately opened and closed a pair of electrical contacts or points. Opening of the points opened an ignition circuit through an ignition coil which abruptly collapsed its magnetic field and induced a voltage high enough to cause arcing in the spark plugs. Variation in the timing of the spark was also performed mechanically.

Intake manifold vacuum is inversely related to engine load and conventionally sensed by a diaphragm. A change in the manifold vacuum moves the diaphragm and associated linkage to shift the points about the axis of the distributor shaft. In this manner the spark is advanced for a high manifold vacuum level signifying a low load upon the engine.

Mechanical devices have additionally been used to advance the occurrence of the spark in response to changes in engine speed. These devices, functionally similar to a governor, employ weights rotated by the distributor shaft to produce a centrifugal force acting against associated restraining springs. At sufficiently rapid rotation, these weights move the platform supporting the points, causing their shift with respect to the axis of the distributor shaft, thereby advancing the spark in relation to engine speed.

The overall operation of mechanical ignition timing control devices has proved to be different in light of present and proposed federal emission standards. Response delay problems, together with calibration and maintenance difficulties caused by mechanical wear and winding impair performance of mechanical timing control devices increasing emission of pollutants.

Known electronic timing control systems have attempted to reduce inaccuracies occurring during the starting of the engine by providing two independent timing references. One such reference is used to trigger the electronic ignition system and its voltage to time converter when the engine is running. The other independent timing reference is used during starting to directly time the spark without the intervention of a voltage to time conversion. These latter systems require additional mechanical hardware such as a pair of timing wheels or pickups.

In some timing control systems the closing as well as the opening of the points are used to provide two independently adjustable timing points. Such a feature defeats one of the advantages of an electronic timing system; that is, the dwell time of the points becomes an important adjustment requiring a skilled mechanic and additional instrumentation.

Increasingly stringent federal emission and performance standards, together with development of precision fuel metering systems capable of precisely controlling air fuel ratios and cylinder to cylinder distribution of fuel to air mixture, have produced a need for a more reliable and controllable ignition advance system. However, up until the time of the present invention, ignition advance systems of the type described have resulted in higher costs and lower operating reliabilities than are considered to be acceptable.

SUMMARY OF THE INVENTION

The present invention provides an improved electronic advance control system coupled to and receiving control signals from a precision fuel metering system which reduces the exhaust emission of an internal combustion engine and provides a stable and accurate spark timing during starting of the engine. The system is associated with an internal combustion engine having a rotatable power shaft and an ignition pulse generating means adapted to produce a recurring ignition pulse. A timing means produces a timing signal that recurs at a timing rate proportional to the rotational speed of the power shaft. Temperature sensing means are provided for producing a heat signal responsive to the temperature of the engine. An advance means responsive to the heat signal and the timing signal produces the ignition pulse at the timing rate. The advance means is operative to advance the occurrence of the ignition pulse in response to temperature of the engine.

In addition, the invention provides an ignition spark advance control system for an internal combustion engine having a rotatable power shaft and an ignition pulse generating means for producing a recurring ignition pulse wherein a timing means produces a timing signal upon the power shaft rotating to a predetermined angular position. The ignition advance control system of this embodiment has a start means for starting the engine and an advance means responsive to at least one operating parameter of the engine for producing the ignition pulse in response to production of the timing signal. During starting of the engine, the ignition pulse is produced before the power shaft rotates a predetermined angle past the predetermined angular position. Subsequent to the starting of the engine, the ignition pulse is produced after the power shaft has rotated past the predetermined angular position by such predetermined angle and for a time interval bearing a predetermined relation to the operating parameter. Whereby, the same timing event initiates the operation of the ignition system when the engine is starting and running.

The number of degrees in advance of top dead center (TDC) at which ignition occurs strongly influences engine efficiency and exhaust emissions. To a limited extent, advancing the spark to lengthen the burn time within the engine chamber, makes available more energy to drive a piston. While this increases efficiency, it reduces the temperature of the engine exhaust gas. It is desirable, under certain engine operating conditions, to initially reduce the spark advancement to elevate the temperature of the exhaust gas so that a catalytic converter disposed in the exhaust pipe is rapidly heated to a point where it operates efficiently. Moreover, reducing spark advancement in this fashion reduces the temperature in the combustion chamber and reduces the production of nitrous oxides or $NO_x$. Accordingly, one aspect of the present invention is provision of a temperature sensing means responsive to the engine temperature. Such an advance means responds to the temperature sensing means to control spark advance in response to engine temperature changes. Therefore, the spark does not tend to be fully advanced, or is held at a fixed advance angle, until the engine temperature rises. As a result, during warm-up, spark advance is reduced so that the catalytic converter is rapidly heated and receives less $NO_x$. Overall exhaust emissions are thereby reduced without affecting the efficiency of a warm engine.

During starting of the engine, the battery voltage can drop and degrade the accuracy of a timing device used to time the spark occurrence. Another aspect of the invention solves this problem by providing a starting means that not only starts the engine but also influences the spark timing. When the engine is starting or running, the timing means produces a timing signal upon the power shaft rotating to a predetermined angular position. During starting, the advance means produces its ignition pulse before the power shaft rotates past that predetermined angular position. After starting, the ignition pulse occurs after the power shaft rotates past the predetermined angular position by a predetermined angle, the magnitude of which depends upon at least one engine operating parameter, such as air-fuel ratio, engine temperature, speed, load and the like.

Using such apparatus, the timing means can provide a single timing event which initiates the operation of the advance means during and subsequent to starting. This eliminates the need for two independent mechanical timing devices for the engine. Moreover, if conventional points are used as a timing means, their dwell angle is non-critical. Furthermore, by producing an ignition pulse in this fashion, the advance means can respond directly to the timing signal during starting without relying on the accuracy of a voltage to time converter.

Another advantage of the invention is that temperature control of spark advancements can be provided by the same circuitry which establishes the spark advancement during the starting of the engine. For example, the advance means can respond to the heat signal or the starting means in the same manner and provide the same spark advancement.

Still another advantage of the invention is its high accuracy. This accuracy can be increased even further by providing an optional delay means in the advance means so that the range of adjustment of the advance means is reduced. This feature also prevents overadvancement of the spark.

An additional feature of the invention is the logic control means, which controls the transition between the start mode and the run mode in order to preclude the absence of a desired ignition pulse or the generation of an unwanted ignition pulse.

Another feature of the invention is its ability to adapt to a wide variety of timing means, its ability to be controlled by a precision fuel metering system having a plurality of common sensing means.

BRIEF DESCRIPTION OF THE DRAWING

The invention will be more fully understood and further advantages will become apparent when reference is made to the following detailed description of the preferred embodiments of the invention and the accompanying drawings in which:

FIG. 4 is a schematic representation of apparatus alternate to that of FIG. 2.

FIG. 5 is a partial schematic representations of apparatus which can be added to that of FIG. 4.

DESCRIPTION OF THE PREFERRED EMBODIMENTS

Figure 1:
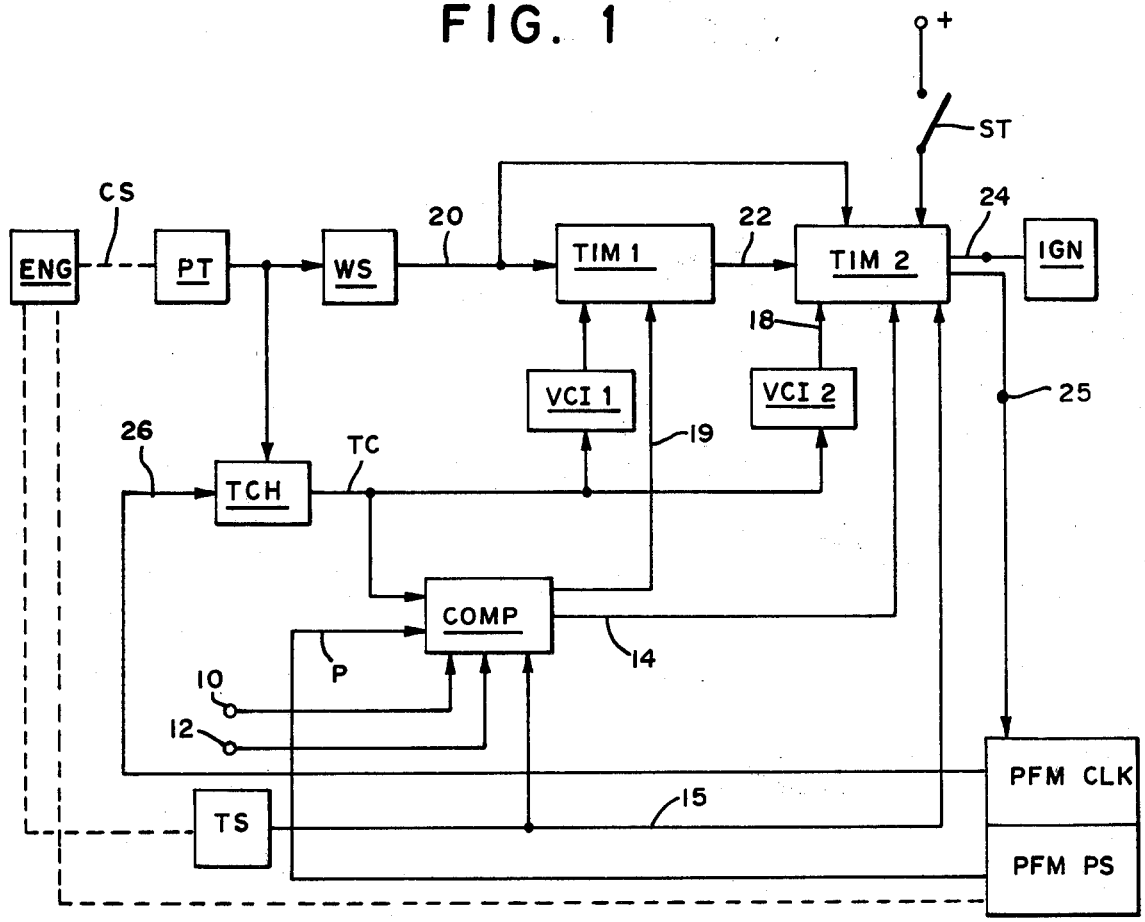
FIG. 1 is a block diagram of an illustrative embodiment incorporating the principles of the invention.

Referring to FIG. 1, the timing means, represented by block PT, is linked to the dotted line CS which represents the power shaft of engine ENG.

Timing means PT produces a timing signal in response to rotation of the power shaft CS of engine ENG. In the specific embodiment of FIG. 1 the timing means PT comprises the well-known points which are mounted within a distributor means mounted on engine ENG. Instead of points, the timing means may employ a magnetic sensor responsive to the passage of teeth on a gear mounted on the power shaft CS. Alternatively, known optical means as well as a wide variety of means for generating a defined timing point may be used. Engine ENG is an eight cylinder, reciprocating piston type of engine wherein power shaft CS rotates a distributor shaft having a multi-lobed cam (not shown) on it. Such a cam actuates points PT at a predetermined angular position of power shaft CS. The illustrative use of this invention in connection with an eight cylinder engine is not intended to limit use of the invention to an eight cylinder engine as the invention can be used in any spark ignited engine that has a plurality of cylinders. For engine ENG, points PT are actuated eight times for two revolutions of its power shaft CS. Accordingly, powershaft CS has four predetermined angular positions at which points PT generate a timing signal. It is understood that other engines may be controlled, including a Wankel rotary engine. In embodiment shown, points PT are actuated 15° in advance of top dead center, however, this setting will be different for different engines. Coupled to the output of points PT is waveshaper WS which couples the timing signal to line 20. It is preferable to employ circuits in waveshaper WS, described hereinafter, which produce a timing signal having reduced noise and a waveshape in the form of a fixed duration pulse, although other embodiments will not utilize such signal conditioning. In the latter instance waveshaper WS can be a simple wire connecting input to output. The timing signal of line 20 is coupled to an advance means shown herein as converter means TIM1 and converter means TIM2. Converter means TIM2 produces an ignition control pulse on terminal 24 in response to the timing signal of line 20. The timing signal of line 20 is also coupled to converter means TIM2 to provide the logic signal required in certain functions of the advance control system. Terminal 24 is coupled to a well-known ignition circuit IGN which produces a spark. This ignition circuit IGN employs a semiconductor switch means operative in response to the ignition control pulse to discharge air energy storage means coupled to an ignition coil, thereby generating the high voltage spark. The ignition control pulse on terminal 24 may be a square wave, a sawtooth, a sinusoidal wave or other waveform. A square wave signal is generated herein since it provides an abrupt voltage change that is useful for timing a spark. Advance means TIM2 is a device that produces its ignition control pulse at a time controlled by operating parameters of the engine. Advance means TIM2 also provides a sequencing control signal to a precision fuel metering system on line 25. In a first embodiment of the invention a heat signal responsive to engine temperature is applied to advance means TIM2 to vary its timing. This first embodiment is effective in reducing exhaust emissions. In a second embodiment of the invention a start means controls advance means TIM1 and advance means TIM2 so that when the engine is starting, the advance means TIM2 responds to timing signal (generated upon the powershaft rotating to a predetermined angular position) to produce the ignition pulse before the powershaft is displaced a predetermined angle therefrom. This second embodiment is effective to provide a stable and accurately timed ignition pulse during starting. The features of the above first and second embodiment have been incorporated into the embodiment of FIG. 1.

Advance means TIM2 may take many forms. For example, the advance means TIM2 may be a digital counter responsive to a timing signal whose repetition rate is proportional to engine speed such that the count stored therein represents angular position of the powershaft CS. Alternatively, a voltage controlled oscillator can be phase-locked to a frequency proportional to engine speed to provide a signal representing powershaft position. In the embodiment of FIG. 1, which is more specifically described hereinafter, advance means TIM2 includes a capacitor (shown hereinafter) which is charged by controlled current generator VCI2 to a voltage representing angular position of powershaft CS. Generator VCI2 charges that capacitor with a signal representing engine speed. By generating a signal representing the position of shaft CS an ignition pulse is produced by advance means TIM2 in conjunction with advance means TIM1, which is referenced to the angular position of shaft CS. Spark advancement is defined herein in terms of the number of degrees before TDC at which shaft CS is located upon the occurrence of the spark.

As previously mentioned, the timing of the ignition pulse is altered by a start means shown herein as a manually operable start switch ST connected between a positive reference potential, such as the car battery, advance means TIM1 and advance means TIM2. Although many other devices can operate satisfactorily, it is convenient to include switch ST in the key operated ignition switch so it closes when the operator starts engine ENG. Closure of switch ST in this fashion affects advance means TIM1 and advance means TIM2 so that it produces its ignition pulse before shaft CS is displaced a predetermined angle from the predetermined position it was at when the timing signal was produced. In this manner the single timing event of timing means PT is used to operate advance means TIM1 and advance means TIM2, whether engine ENG is starting or running. In the embodiment of FIG. 1 the ignition pulse during starting occurs synchronously with the timing signal so that the ignition pulse is as accurate as the timing signal. However, the ignition pulse in other embodiments can be delayed for a fixed interval with respect to the timing signal, during starting.

A delay means is shown herein as advance means TIM1 driven by controlled current source VCI1, both of which may be constructed similarly to advance means TIM2 and generator VCI2. Just as various devices may perform the functions of advance means TIM2 and generator VCI2, various devices can provide a delay means. Device TIM1 has an input connected to line 20 and an output to advance means TIM2. Device TIM1 produces a delay signal in delayed response to the timing signal on line 20. This delay is controlled by source VCI1 which produces a current proportional to engine speed. Accordingly, the delay of device TIM1 is inversely proportional to engine speed. This delay is provided by a capacitor (described hereinafter) which is charged by source VCI1 to a voltage representative of engine displacement. In this manner a delay is provided which corresponds to a fixed angular displacement of shaft CS. The delay signal of TIM1 is transmitted to TIM2 so that the maximum advance provided by advance means TIM2 is limited to the value set by advance means TIM1.

As mentioned previously advance means TIM2, responds to an engine parameter such as a heat signal responsive to the temperature of engine ENG. To this end a heat signal is produced on line 15 by temperature sensing means TS. In an embodiment described hereinafter the heat signal is directly coupled to advance means TIM2. In another embodiment described hereinafter the heat signal may be additionally coupled through a control means which applies a signal responsive to engine temperature to advance means TIM1 and advance means TIM2. Both connections are shown in FIG. 1 for purposes of generalization: Specifically, a heat signal on line 15 connects directly to advance means TIM2 and is also connected to control means COMP which is connected to advance means TIM1 by line 19 and advance means TIM2 by line 14. Two embodiments of control means COMP are described hereinafter although other embodiments will be apparent to persons skilled in the art.

In FIG. 1 control means COMP is shown connected to five different sensors, although in other embodiments fewer or greater than five sensors can be employed. One sensor connected to control means COMP is temperature sensing means TS. It employs a temperature-dependent device mounted in thermal contact with engine ENG. In one embodiment described hereinafter sensing means TS is a temperature-dependent resistance and in another embodiment it is a bi-metallic switch that opens and closes at predetermined temperatures. Other temperature sensing means will be apparent to persons skilled in the art.

Another sensor shown connected to control means COMP is load sensing means PS which develops on line P a load signal derived from the load sensing means in the precision fuel metering system. As is well known, the load on engine ENG can be measured indirectly by measuring the vacuum of the intake manifold (not shown). Accordingly, load sensing means PS in this embodiment utilizes a well-known pressure transducer that is responsive to the same manifold vacuum signal utilized in the precision fuel metering system.

The ignition advance control system may also respond to engine speed as measured by a speed sensing means TCH. This embodiment employs a well-known tachometer circuit that produces a voltage on line TC which is proportional to the repetition rate of the precision fuel metering clocking system. The latter is, in turn, proportional to the ignition repetition rate. Conventional tachometer circuits can utilize a fixed duration pulse generator whose output is filtered to obtain a direct current signal proportional to the input frequency, although other known circuits will operate as well. Terminals 10 and 12 have connected to them additional engine sensors which respond to other operating parameters such as the position of the accelerator pedal (not shown) ambient temperature, etc. All of the sensors TCH, PS, TS and terminals 10 and 12, are shown connected to control means COMP. The output of tachometer circuit TCH is also connected to control inputs of the two voltage controlled current generators VCI1 and VCI2. Generators VCI1 and VCI2, described in further detail subsequently, thereby produce output currents on lines 16 and 18, respectively, which are proportional to the input voltage on line TC.

As will be apparent from considering the embodiments of control mean COMP described hereinafter, its response to sensors PS and TCH may be arranged to satisfy the specific requirements of engine ENG. For example, low manifold vacuum and engine speed, such as occurs when accelerating from zero velocity produces a control signal corresponding to minimum spark advancement. As engine speed and manifold vacuum increase, spark advancement is increased up to some practical maximum. Also, the heat signal of sensor TS operates to control spark advance in response to engine temperature changes. The various forms control means COMP may take will be more fully understood after considering the embodiments described hereinafter.

When running, engine ENG actuates its points PT once for each quarter revolution of powershaft CS. Upon each such actuation a timing signal is produced by waveshaper WS in advance of top dead center. In the constructed embodiment waveshaper WS provides a 0.2 ms pulse 15° before TDC. This pulse triggers converter TIM1 which produces after a delay interval, a delay signal. This delay is controlled by source VCI1 which produces a current proportional to the rotational speed of engine ENG. In this manner the time delay of converter TIM1 is inversely proportional to engine speed so that the delay corresponds to a fixed displacement of shaft CS. In the embodiment shown, the delay corresponds to 45° of shaft displacement. Since the timing signal occurs at 15° before TDC, 45° displacement therefrom corresponds to 30° past TDC. It is appreciated that 30° past TDC for a given cylinder in a successively firing eight cylinder engine corresponds to an advance angle of 60° for the following cylinder. Therefore while running, the timing signal occurs during the compression stroke of one cylinder but the delay signal services a succeeding cylinder during its compression stroke. After such delay, the pulse from converter TIM1 is applied to advance means TIM2 to trigger its operation. This triggering, occurring at 60° in advance of TDC corresponds to the earliest possible ignition of the fuel in the associated cylinder of engine ENG. This feature prevents advance means TIM2 from generating an ignition pulse so early that a counter-productive force, would be generated. Due to the action of the high voltage distributor timing, the correct cylinder receives the ignition pulse at the proper advance angle.

Figure 2:
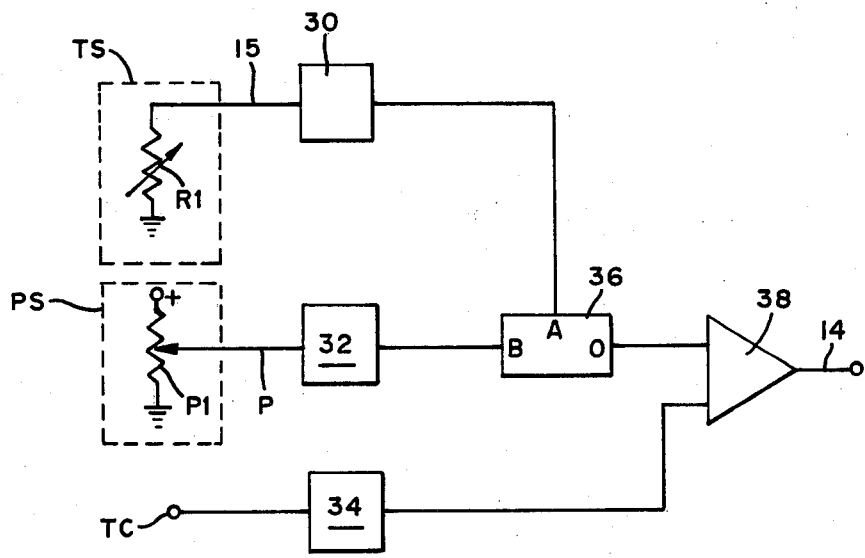
FIG. 2 is a more detailed block diagram of a portion of the system of FIG. 1.

Referring to FIG. 2, the control means is shown in block diagram form. Employed herein is a modulator means 36 which is not employed in another embodiment, described hereinafter. If the present embodiment is utilized, it provides the functions of control means COMP of FIG. 2 and, therefore, the terminals and lines bearing the same designations in FIGS. 1 and 2 are connected together. Modulator means 36 has a variable transfer characteristic between its input B and output O. It employs a well-known gain control (AGC) systems. Alternatively, a chopper operating at a high variable frquency may be employed. In another form modulator 36 may be a common emitter transistor operating with collector currents sufficiently small that the collector characteristic approximates a variable resistance adjustable with base current. Other techniques including multiplier techniques will be apparent to those skilled in the electronic art. Modulator 36 is employed herein to alter the sensitivity of the control signal on terminal 14 to an engine parameter. The engine parameter modulated herein is engine load, although other parameters such as engine speed may be modulated. Accordingly, the input signal applied to input B of modulator 36 is a load signal responsive to engine load. The amount of modulation provided is controlled by a heat signal applied to input A of modulator 36. The heat signal is shown herein as generated by a thermistor R1 in thermal contact with the engine and electrically connected to a signal coupler 30 whose output drives input A of modulator 36. It is appreciated that many thermally responsive devices may be alternatively used including a bimetallic link driving the wiper of a potentiometer. The specific response on terminal 14 to changes in engine temperature as produced by modulator 36 is selected to satisfy the specific requirements of engine ENG. It is selected to that over a given range of engine temperature, increases in that temperature will change the control signal in a direction to increase spark advancement. Coupler 32 supplies the load signal in response to the signal on line P. The signal on line P is shown as developed on the wiper of potentiometer P1 whose extreme terminals are connected between a reference potential and ground. The wiper of potentiometer P1 is linked to and moves with a pressure sensor that is displaced by changes in vacuum of the engine intake manifold, and is part of the precision fuel metering system. Such diaphragm apparatus is a well-known means for obtaining a measure of engine load. It is, however, appreciated that strain gauges mounted on the engine shaft CS can also obtain a measure of engine load.

The heat and load signals operate to increase spark advancement as engine temperature and manifold vacuum increase. For relatively low temperatures, for example 60° F. or less, coupler 30 produces a maximum attenuation of the load signal. This tends to reduce spark advancement. At normal rated engine temperature coupler 30 produces a modulating signal causing modulator 36 to produce the least attenuation of the load signal, thereby tending to increase spark advancement. In between those temperature extremes the amount of modulation provided by linear modulation with respect to temperature, it is contemplated that for some embodiments, a non-linearity can be introduced to cause a relatively large change in modulation for engine temperatures over which the efficiency of the engine's catalytic converter changes most significantly. Therefore, the degree of modulation provided by coupler 30 and modulator 36 as a function of temperature can be chosen to suit the specific engine and catalytic converter. The control means may respond to other engine operating parameters. To this end the speed signal on terminal TC is coupled, through coupler 34. The generation of such speed signal was discussed previously in connection with sensor TCH (FIG. 1). The control signal on terminal 14 is rendered responsive to the heat, load and speed signals by a summer 38, having an output connected to terminal 14. Summer 38 has two inputs separately connected to the output of coupler 34 and the output O of modulator 36. Summer 38 is an amplifier providing an output representing the linear combination of its inputs.

Couplers 30, 32 and 34 have predetermined transfer characteristics which are chosen to accommodate the particular engine and automobile utilized. As is well known, different engines require different amounts of spark advance through their range of operating speed and load. The gains of couplers 32 and 34 are adjusted to account for this variation. In the embodiment of FIG. 2, couplers 32 and 34 comprise linear buffer amplifiers, although non-linearites can be utilized to alter the ignition system's sensitivity to the sensors within certain subranges of operating conditions to suit the requirements and peculiarities of various engines.

Figure 3A:
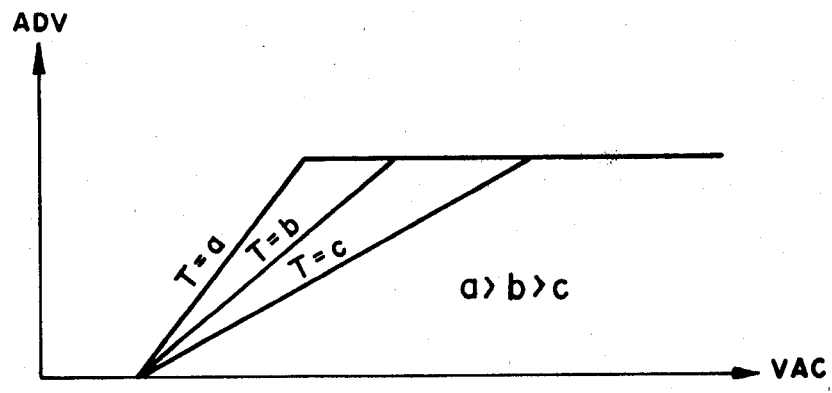
FIGS. 3A and 3B are graphical representations of the relation between parameters associated with the apparatus of FIG. 2.

The effect of changes in manifold vacuum and engine temperature upon spark advancement provided by the apparatus of FIG. 2 is displayed graphically in FIG. 3A. Each member of the family of curves therein shows the relation between manifold vacuum, VAC (abscissa), and the degrees in advance of TDC at which the spark occurs, ADV (ordinate). Each member of the family of curves has the same maximum and minimum values of spark advancement, which are established by the saturation and cutoff limits of the amplifier of summer 38 (FIG. 2). The temperature modulation provided by modulator 36 results in an increased slope in the linear region of the curves as temperature (T) increases.

Figure 3B:
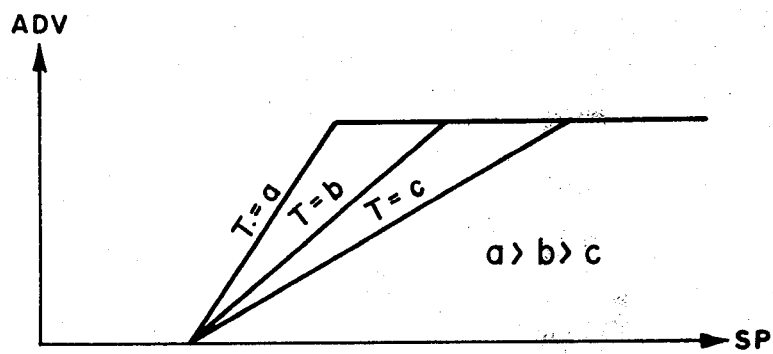

While the modulator 36 (FIG. 2) alters the system sensitivity to manifold vacuum or load, alternatively, sensitivity to engine speed can be altered. In such an arrangement a temperature dependent modulator would be interposed between speed sensor coupler 34 (FIG. 2) and summer 38. This analogous temperature sensitivity is shown in FIG. 3B wherein a family of curves are plotted against engine rotational speed, SP (Abscissa), and the degrees in advance of TDC at which the spark occurs, ADV (ordinate). The slope of the spark advance to engine speed characteristic is increased for increased engine temperature (T).

From the foregoing it is appreciated that engine temperature can influence the spark advancement in many ways. For example, the smoothly changing slopes of FIGS. 3A and 3B can be made to abruptly change upon the engine temperature reaching a certain level. Alternatively, the heat signal can be used as an independent measured parameter that is summed with the other measured parameters in a linear manner, without the intervention of a modulator. Another alternative is using the heat signal to establish a maximum spark advancement. In this latter example, the heat signal can control a clamping circuit which limits the control signal. Such limiting could be provided by a transistor whose operating potential varies with the heat signal so at cutoff, its maximum output is a function of engine temperature. Other variations will be apparent to persons skilled in the art. In an embodiment described hereinafter, the heat signal is coupled directly to the advance means to establish a fixed timing.

Referring to FIG. 4, there is shown part of a control means. In this illustrative embodiment a load clamp means is shown driving a combining means. A load clamp is shown herein as a first and second means comprising amplifiers 40 and 44, respectively. This load clamp has an output limited between a first and and second voltage level. It is apparent that such a function can be alternatively performed by clamping diodes which are biased to conduct at this first and this second voltage. The sensor PS previously described in FIG. 1, is shown herein as a potentiometer P1.

The output of the apparatus of FIG. 4 is at terminal E0. In some embodiments this terminal connects directly to line 14 of FIG. 1. However, as described subsequently, terminal E0 is instead coupled to line 14 (FIG. 1) by means of the apparatus of FIG. 5 to provide the additional features associated therewith.

Vacuum responsive potentiometer P1, constructed identically to the similarly identified potentiometer of FIG. 2, has its wiper at a potential VL. This wiper is connected to the non-inverting terminal of operational amplifier 40 by means of buffer amplifier 42 which has a gain of $\frac{1}{2}$. Serially connected between the emitter of transistor Q1 and a terminal biased at positive potential V3 are equally valued resistors R1 and R2 whose junction is conneced to the inverting terminal of amplifier 40. The potential V3 and other potentials herein are provided by voltage dividers (not shown) coupled to the terminal E. The output of amplifier 40 is connected to the base of transistor Q1 which has a collector resistor R3 and an emitter resistor R4 connected to ground. The supply potential of terminal E is commonly supplied to resistor R3 and other devices in this and other figures. Therefore, terminal E is a supply voltage providing common operating potential. It is appreciated that more than one operating potential at more than one voltage can be utilized instead. Also, the ground is understood to be some reference potential. It is also understood that isolated grounds can be used or that certain groups of ground reference points can be at a different potential than the others. Also the operating potential is generally understood to supply biasing when such is described herein.

The second means is shown herein as a threshold voltage V4 supplied to amplifier 44, although as previously mentioned, other arrangements are possible. Potentiometer P2, connected between terminal E and ground, has its wiper set to produce the fixed potential V4 which is halved to voltage divider R5, R6 and applied to the non-inverting terminal of operational amplifier 44. Its inverting terminal is connected to the junction of equally valued resistors R7 and R8 which are serially connected between the junction of resistors R2 and R4 and the junction of resistors R9 and R10. The emitter of transistor Q2 is connected to one terminal of resistor R9 whose other terminal is connected to ground through resistor R10. The collector and base of transistor Q2 are respectively connected to terminal E and the output of amplifier 44. Potentiometer P3, connected between the emitter of transistor Q2 and ground, has a wiper connected to one terminal of resistor R11. As explained more fully hereinafter, potentials V3 and V4 establish the range over which the load signal V1 is influential.

The second means is shown herein as a threshold voltage V4 supplied to amplifier 44, although as previously mentioned, other arrangements are possible. Potentiometer P2, connected between terminal E and ground, has its wiper set to produce the fixed potential V4 which is halved by voltage divider R5, R6 and applied to the non-inverting terminal of operational amplifier 44. Its inverting terminal is connected to the junction of equally valued resistors R7 and R8 which are serially connected between the junction of resistors R2 and R4 and the junction of resistors R9 and R10. The emitter of transistor Q2 is connected to one terminal of resistor R9 whose other terminal is connected to ground through resistor R10. The collector and base of transistor Q2 are respectively connected to terminal E and the output of amplifier 44. Potentiometer P3, connected between the emitter of transistor Q2 and ground, has wiper connected to one terminal of resistor R11. As explained more fully hereinafter, potentials V3 and V4 establish the range over which the load signal VL is influential.

A combining means is shown herein as a buffer means comprising buffer amplifier 46. It is apparent that other devices such as resistive mixing network could be employed instead. Amplifier 46 receives a signal from the load clamp means by resistor R11 which is connected between the wiper of potentiometer P3 and the non-inverting input of amplifier 46. This non-inverting input is connected to the junction of resistors R12 and R13. These two resistors are serially connected between ground and the wiper of potentiometer P4 which is set at potential V5, a potential intermediate that of the supply and ground potential connected across this potentiometer. The potential V5 is a voltage reference source, which could be supplied by other means such as a battery. Resistors R11, R12 and R13 are equally valued in this embodiment. Terminal TC which corresponds to the similarly identified terminal in FIG. 1 has serially connected between it and ground equally valued resistors R14, R15 and R16, in that order. The inverting terminal of amplifier 46 is connected to the junction of equally valued resistors R14, R15 and R17, resistor R17 being a grounding resistor and resistor R15 providing negative feedback. Transistor Q3 has its base, collector and emitter connected to the output of amplifier 46, terminal E and the junction of resistors R15 and R16, respectively, the latter junction being designated terminal E0.

The cooperation between the load clamp means and combining means will now be described briefly. Transistor Q1 and resistor R2 provide negative feedback around amplifier 40 such that the output voltage of the emitter of transistor Q1 equals the difference in potential between that of the wiper of potentiometer P1 and potential V3. It is appreciated that negative voltages are not provided by transistor Q1. Having similar negative feedback, amplifier 44 produces at the junction of resistors R9 and R10 a voltage equal to the potential difference between the emitter of transistor Q1 and the potential V4. Potentiometer P3, arranged to alter the sensitivity of the ignition advance control system to vacuum potentiometer P1, can be adjusted to produce from 0 to 130% of the voltage at the junction of resistors R9 and R10. If the specific percentage adjustment is designated "a", the potential on the wiper of potentiometer P3 is $$a(V4+V3-VL)$$

up to a maximum of V4 and a minimum of zero volts, which are the limits provided by amplifiers 42 and 44, respectively. This voltage has added to it the potential V5 and subtracted from it the speed signal on terminal TC by means of the negative feedback amplifier comprising amplifier 46, transistor Q3 and resistor R15. The associated resistances are valued such that the voltage at terminal E0 is $$V5-VTC+a(V4+V3-VL)$$

where VTC is the potential at terminal TC. The maximum voltage at terminal E0 is a V4+V5 and the minimum is zero volts.

It is appreciated that until the manifold vacuum increases to a point where VL exceeds the potential V3 transistor Q1 is cut-off and unresponsive to manifold vacuum. Accordingly, potential V3 can be set to correspond to the small vacuum occurring during high acceleration or other high load conditions as well as during starting. This limits the reduction in spark advancement occurring in response to very high engine load. For manifold vacuum sufficiently high to raise potential VL above V3 and cause the voltage at the junction of R2, R4, R7 and Q1 to exceed V4, transistor Q2 cuts off and becomes unresponsive to manifold vacuum. This limits the ability of the potentiometer P1 to further advance the spark.

Potentials V3, V4 and V5, as well as the sensitivity setting of potentiometer P3, are selected to satisfy the requirements of the specific engine being controlled. As will be apparent from subsequent description, decrease in the potential of terminal E0 increases spark advancement.

Referring to FIG. 5 part of an illustrative control means is shown as an optional low speed sensing means. The low speed sensing means herein is shown as a threshold means comprising amplifier 48 and an output circuit comprising amplifier 50. Amplifier 48 is biased so that it is responsive only when the speed signal on terminal TC is less than a potential V6. This apparatus is employed by connecting its terminals TC and E0 to the similarly identified terminals of FIG. 4. In this case terminal E0 (FIG. 4) is not connected to line 14 of FIG. 1 but terminal E0' of FIG. 5 is. Other apparatus may provide a low speed sensing means. For example, a speed signal may be connected to a biased diode which conducts only when the speed signal indicates engine speed less than a given magnitude.

Potential V6 is produced on the wiper of potentiometer P5 whose extreme terminals are connected between ground and terminal E. Potential V6 is halved by voltage divider R18, R19 and applied to the non-inverting terminal of operational amplifier 48 whose inverting terminal is connected to the junction of equally valued resistors R20 and R21. These two resistors are serially connected between an extreme terminal of potentiometer P6 and terminal TC, a terminal having the same voltage thereon as the similarly identified terminal of FIG. 4. Transistor Q4 has its collector connected to terminal E, its base to the output of amplifier 48 and its emitter to the junction of resistor R21 and one extreme terminal of potentiometer P6. The other extreme terminal of potentiometer P6 is grounded.

An output circuit is shown herein as an amplifier 50 coupled to the wiper of potentiometer P6 and to terminal E0. Other arrangements are possible and for some embodiments a resistive mixing network can be used.

To receive a signal from the threshold means, resistor R22 is connected between the wiper of potentiometer P6 and the non-inverting terminal of amplifier 50. Resistors R22, R23 and R24 are equally valued resistors each having one terminal connected to the non-inverting input of amplifier 50, the other terminals of resistors R23 and R24 are connected to terminal E0 and ground, respectively. The anodes of diodes CR1 and CR2 are connected to terminals STRT and IDL, respectively, and their cathodes are connected to one terminal of resistor R25 whose other terminal connects to the non-inverting terminal of amplifier 50. Terminal STRT has a positive voltage applied to it when the engine is starting and terminal IDL receives the same voltage when the accelerator pedal (not shown) is released. It will be apparent from subsequent description that these terminals can cause a maximum control signal at terminal E0 to produce a minimum spark advancement. Transistor Q5 has a grounded emitter resistor R26 and has its collector connected to terminal E and its base connected to the output of amplifier 50. The emitter of transistor Q5, designated terminal E0', has connected between it and the junction of the inverting terminal of amplifier 50, resistor R28. Resistor R27 is connected between ground and the junction of amplifier 50 and resistor R28. Resistor R28 provides negative feedback which stabilizes the gain of amplifier 50 and transistor Q5.

In operation amplifier 48, resistor R21 and transistor Q4 form a negative feedback amplifier which produces at the emitter of transistor Q4 a signal equaling the difference between potential V6 and the positive potential at terminal TC. This difference signal appears when the former potential exceeds the latter, and is zero otherwise. Potentiometer P5 is used to set an engine speed threshold below which a non-zero difference signal is provided from transistor Q4. When the threshold is exceeded, the output signal E0' follows E0 substantially without change. In one embodiment this speed threshold was set at 2400 rpm. Potentiometer P6 is used to control the amount of speed derived voltage added to E0 to generate output E0', which modifies the speed advance curve below the set speed. To this end the signal on the wiper of potentiometer P6 is summed with the potential on terminal E0 by means of a unity gain amplifier comprising amplifier 50.

Figure 3C:
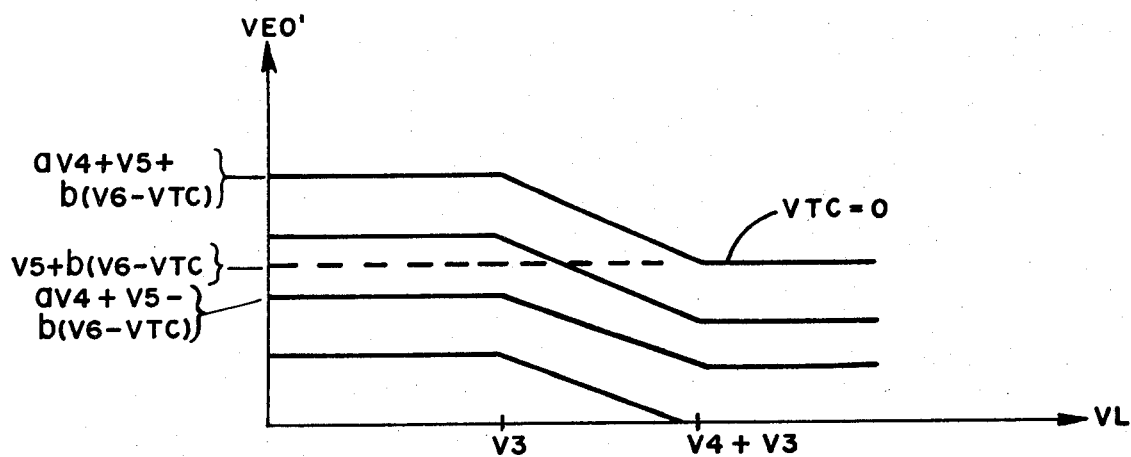
FIG. 3C and FIG. 3D are a graphical representation of the relation between parameters associated with the apparatus of FIGS. 4 and 5.
Figure 3D:
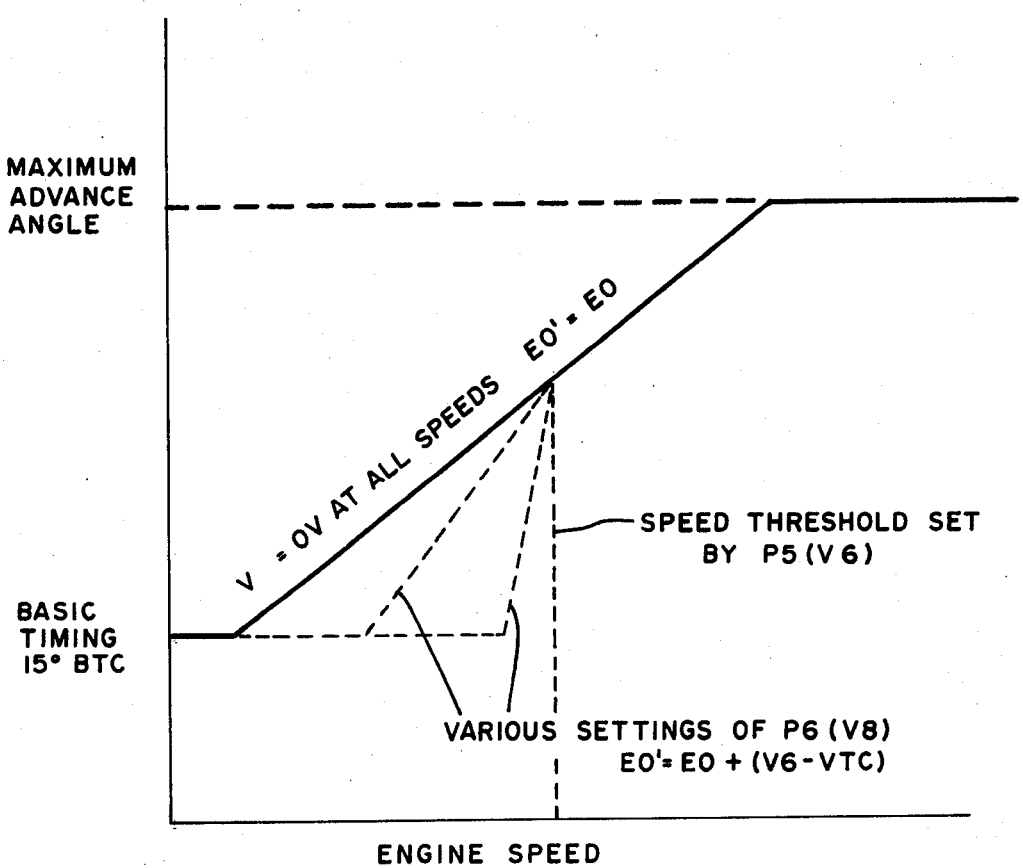

The combined response of the apparatus of FIGS. 4 and 5 can be more fully understood by reference to FIG. 3C which shows a family of curves. In this graphical representation the voltage on terminal E0' is designated VEO' (ordinate) and the vacuum-dependent potential is designated VL. It is appreciated that an increase in potential VL corresponds to increased vacuum and decreased engine load. In FIGS. 3C and 3D the parameters a and b correspond to the settings of potentiometers P3 and P6, respectively. The voltage VEO' is a piecewise-linear function of the vacuum potential VL. The curve is shifted downward as the potential on terminal TC (FIGS. 4 and 5) increases with increasing engine speed.

The effects of potential, b(V6-VTC), may be more fully understood by referring to FIG. 3D. VL is held constant at a value where the advance angle is determined solely by VTC, given the circuit settings of FIGS. 4 and 5 with V6 held at a constant value.

The solid curve of FIG. 3D labeled V8=0, is the advance curve versus speed. The dashed lines illustrate the effects of various settings of potentiometer P6.

Figure 6:
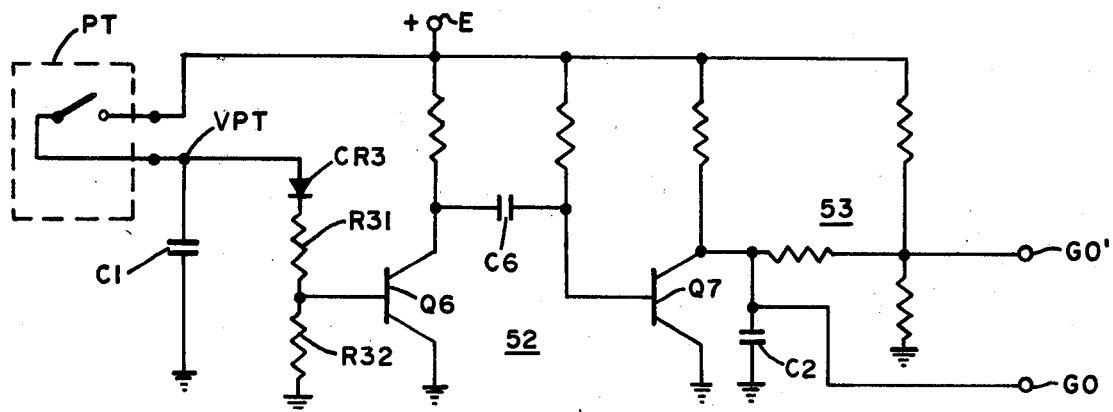
FIG. 6 is a more detailed schematic representation of the waveshaper of FIG. 1.

Referring to FIG. 6 a circuit means coupled to a switch is shown herein as previously described points PT driving a pair of capacity coupled transistors Q6 and Q7 connected in the common emitter mode. The circuit shown herein produces simultaneous output pulses on terminals G0 and G0' of the same fixed duration. It is apparent that other devices such as a one-shot multivibrator could perform the same function. Furthermore, depending on the closure time of points PT, some embodiments may not require this apparatus. Alternatively, the circuits driven by the circuit means of FIG. 6 may respond so rapidly that it does not require the longer enduring signal which the circuit means can provide.

The circuit means herein is an embodiment of the waveshaper WS of FIG. 1 previously described. The points PT in FIG. 6 are connected between the supply voltage on terminal E and filtering capacitor C1. Connected in parallel with capacitor C1 is the serial combination of diode CR3, resistors R31 and R32, in that order. The anode of diode CR3 is connected to the junction of points PT and capacitor C1. A pair of capacitively coupled transistors amplifiers 52 comprise transistor Q6 driving transistor Q7 through capacitor C6 both transistors being in a common emitter configuration. The output of amplifiers 52 at terminal G0 is shunted to ground by filtering capacitor C2. The signal at terminal G0 is attenuated and shifted in level by resistor network 53 to produce a signal at terminal G0'. Transistors Q6 and Q7 have suitable collector resistors and transistor Q7 has a suitable base biasing resistor. Resistor network 53, connected between the collector of transistor Q7 and terminal G0' allows the transistor to provide at terminal G0' a voltage swing between 20 to 87% of the supply potential at terminal E. In operation, the opening of points PT places the base of transistor Q6 at zero potential allowing capacitor C6 to charge. The closure of points PT turns transistor Q6 on, effectively connecting the positively charged terminal of capacitor C6 to ground, thereby reverse biasing the base-emitter junction of transistor Q7. Transistor Q7 therefore turns off, producing a positive pulse on terminals G0 and G0' until the charge on capacitor C6 is, after a fixed interval, reversed.

Figure 7:
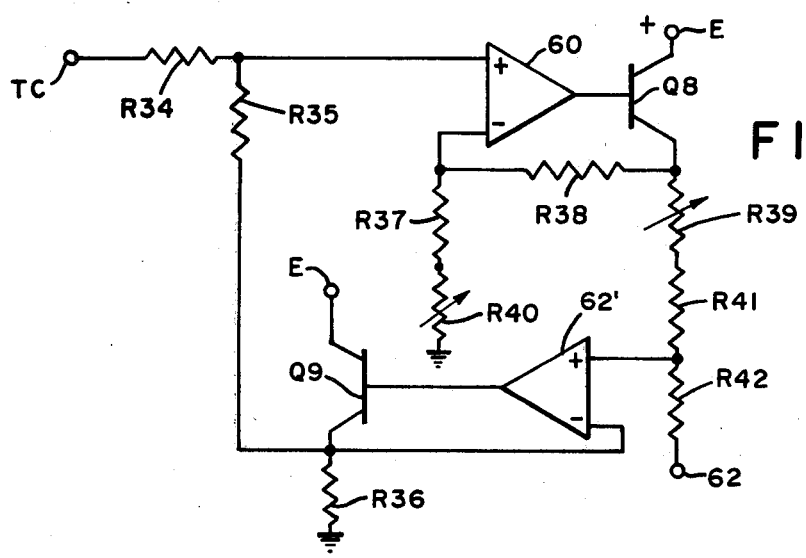
FIG. 7 is a more detailed schematic representation of the controlled current generators of FIG. 1.

Referring to FIG. 7, a controlled current generator (current source) is shown therein as transistor Q8 being controlled by the voltage on terminal TC. There are many known arrangements which provide a controlled current and, for this reason, the specific circuit herein is exemplary. The generator herein is employed twice; as generator VCI2 (FIG. 1) and source VCI1 (FIG. 1). The terminal TC is connected to the speed sensing means TCH (FIG. 1) to produce a current from terminal 62 (FIG. 7) which is proportional to engine speed. In FIG. 7 resistors R34, R35, and R36, serially connected between terminal TC and ground in that order have their junction of resistors R34 and R35 connected to the non-inverting terminal of amplifier 60. Its inverting terminal is connected to the junction of resistors R37 and R38 and its output is connected to the base of transistor Q8. Transistor Q8 has its collector connected to terminal E and its emitter is connected to the junction of resistor R38 and variable resistor R39. Serially connected between ground and terminal 62 are variable resistor R40, resistors R37 and R38, variable resistor R39 and resistors R41 and R42, in that order. The junction of resistors R41 and R42 are connected to the non-inverting terminal of operational amplifier 62 whose inverting terminal and output are separately connected to the emitter and base of transistor Q9, respectively. Transistor Q9 has a grounded emitter resistor R36 and a collector connected to terminal E. Terminals TC and E correspond to the similarly identified terminals in FIG. 4. Terminal 62 (FIG. 7) corresponds to line 16 or 18 of FIG. 1 depending on which of the two generators VCI1, VCI2, the apparatus of FIG. 7 is associated with.

In operation, amplifiers 60 and 62 produce a voltage across resistors R39 and R4 which is proportional to the voltage at terminal TC. This result occurs since amplifier 62 is part of a unity gain amplifier producing at the emitter of transistor Q9, a voltage equaling that at the junction of resistors R41 and R42. This voltage is summed with the voltage at terminal TC so that the output voltage at the emitter of transistor Q8 exceeds the voltage at the junction of resistor R41 and R42 by an amount proportional to the voltage at terminal TC. By fixing the voltage across resistors R39 and R41 in this manner, they perform as a current source and provide a current into terminal 62 proportional to the voltage at terminal TC. Variable resistor R39 is used to adjust the transconductance from terminal TC to 62. Variable resistor R40 is employed to set the net gain from the non-inverting input of amplifier 62 to the emitter of transistor Q8 at unity.

Figure 8:
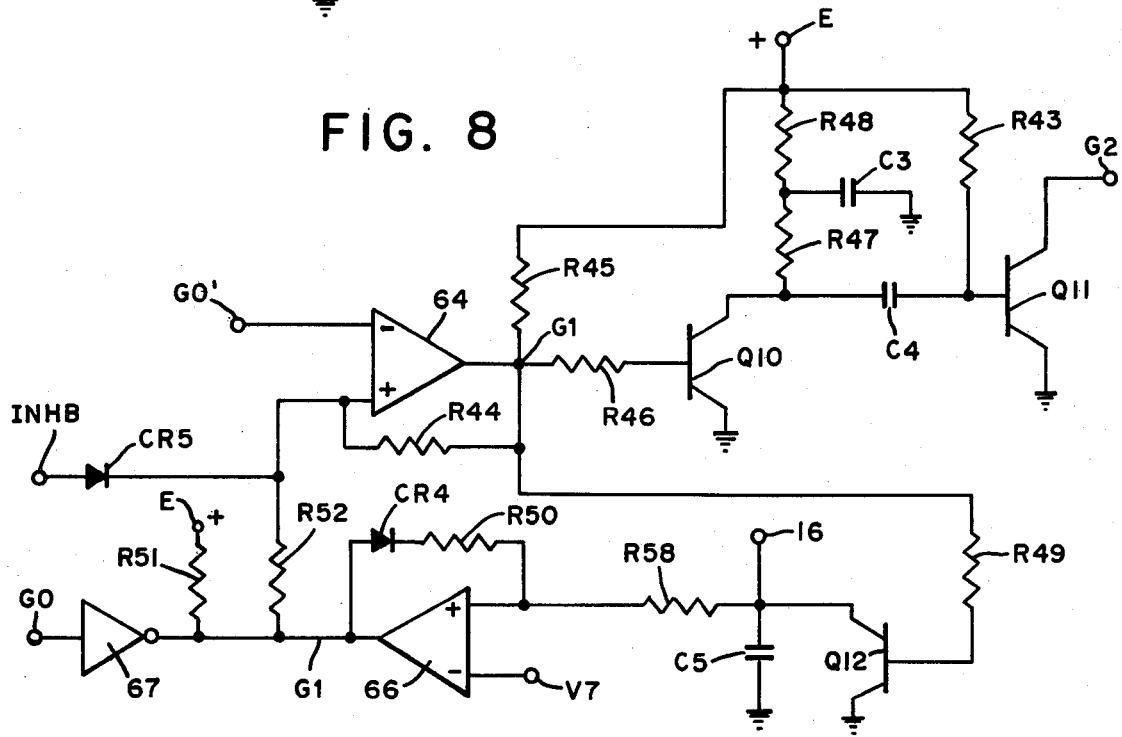
FIG. 8 is a more detailed schematic representation of the delay means of FIG. 1.

Referring to FIG. 8 a threshold device which is part of a delay means is shown together with a capacitor C5. The threshold device is shown herein as a comparator 66. A signal on terminal 16 charges capacitor C5 until after a delay interval, the charge exceeds a fixed potential V7. A one shot multivibrator could provide this function. Such a multivibrator could be time modulated with the signal on terminal 16. Capacitor C5 is charged by a current source as shown in FIG. 7 although other controlled current sources can be employed. The current from terminal 16 is proportional to engine speed to that the charge on capacitor C5 is linearly related to the displacement of the crank shaft of the engine. Resistor R58 is connected between the non-inverting terminal of comparator 66 and one terminal of capacitor C5 whose other terminal is grounded. Comparator 66 produces a positive signal when the potential of capacitor C5 exceeds potential V7. Diode CR4 and resistor R50 are serially connected between the output and non-inverting input of comparator 66 to provide positive feedback and hysterisis. Diode CR4 is poled with its anode connected to the output of comparator 66. Operation of the delay means is initiated by the timing signal applied to terminals G0' and G0. Terminal G0 is connected to the input of inverter 67 whose output connects to the junction of the output of comparator 66 and one terminal of resistor R52. Its other terminals connects to the non-inverting terminal of amplifier 64 whose inverting terminal connects to terminal G0'. Comparator 66 and inverter 67 having open collector type of output circuits, their junction is connected to biasing resistor R51. Accordingly, a positive signal on terminals G0 and G0' causes the application of a positive and zero signal on the inverting and non-inverting inputs of amplifier 64, respectively. Amplifier 64 is provided with positive feedback by resistor R44 connected between its output and non-inverting input. As a result of this and the biasing effects of G0', the circuitry of amplifiers 66 and 64 becomes a conditioned set-reset flip-flop. Its output is connected to the junction of biasing resistor R45 and one terminal of resistor R46 whose other terminal is connected to the base of transistor Q10. Transistor Q10 has serially connected collector resistors R47 and R48 which are connected to the supply potential at Terminal E and whose junction is connected to bypass capacitor C3. The collector of transistor Q10 is capacitively coupled to the base of common emitter transistor Q11 by means of capacitor C4 to provide an output on terminal G2. The base of transistor Q11 is connected to biasing resistor R43. The output of amplifier 64 is connected through resistor R49 to the base of common-emitter transistor Q12 whose collector is connected to the junction of grounded capacitor C5, terminal 16 and one terminal of resistor R58. Being connected in this fashion transistor Q12 can be turned on to discharge capacitor C5 and establish initial conditions.

Although the operation of the entire ignition advance control system disclosed herein will be described subsequently, the specific operation of the circuit of FIG. 8 will now be briefly described, so that the subsequent description of overall operation is more readily understood.

In operation the circuit of FIG. 8 responds to a positive signal applied to terminals G0 and G0' at the closure of points PT (FIG. 6) to produce a fixed duration pulse, at output G2 after a delay which is proportional to potential V7. It is assumed that points PT (FIG. 6) are open and the output of amplifier 64 (FIG. 8) is positive which when fed back through resistor R44 keeps the non-inverting terminal at a higher potential than terminal G0'. As a result, transistor Q12 is turned on to discharge capacitor C5. That this condition will exist will be made clear from considering the following operation.

Figure 10:
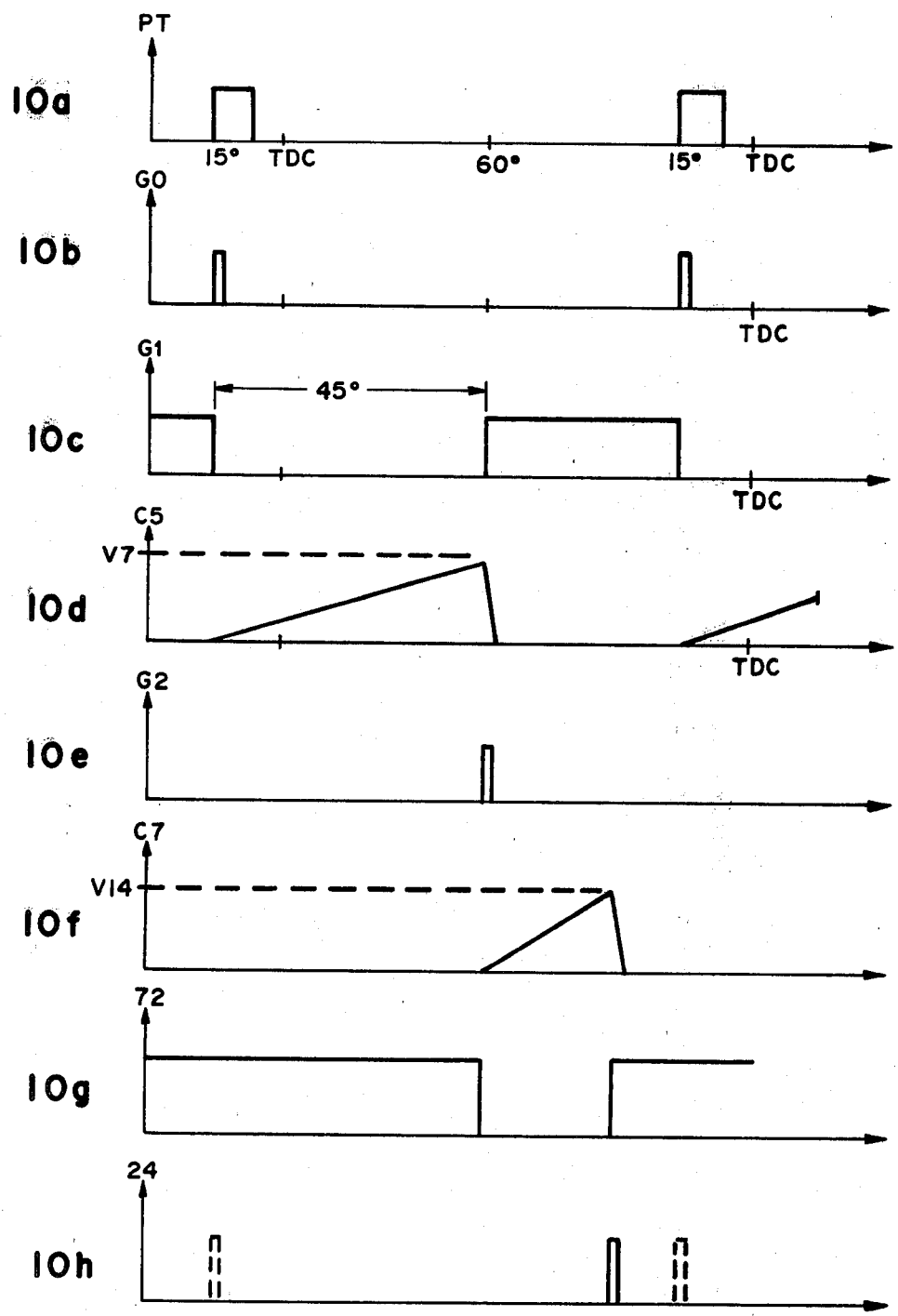
FIG. 10 is a graphical representation of signals associated with the apparatus of FIGS. 4 through 9.

Upon the closure of points PT (FIG. 6) a positive signal is applied to terminal G0' (FIG. 8) of a magnitude sufficient to produce a zero volt signal from amplifier 64 which turns off transistors Q10 and Q12. With transistors Q10 off, capacitor C4 begins charging toward the potential of terminal E. With transistor Q12 off, capacitor C5 is charged by the current applied to terminal 16, which charges capacitor C5 at a rate proportional to engine speed. As the potential on capacitor C5 increases amplifier 66 compares potential V7 to that of capacitor C5, without being affected by R50 as CR4 is reversed biased. Next the potential on terminals G0 and G0' are reduced without substantial effect, after the expiration of a fixed time interval. The output of amplifier 64 does not change because of the holding action of resistors R52 and R44 in combination with the quiescent bias level on G0' input. Upon capacitor C5 charging to a potential in excess of potential V7 amplifier 66, operating as a comparator, produces a high output signal. It is appreciated that for amplifier 66 a high signal corresponds to its output transistor being cut-off to effectively present an open circuit. Being similarly constructed, the output of inverted 67 also presents an open circuit since at this time its input terminal is at the zero voltage of terminal G0. With both amplifier 66 and inverter 68 presenting open circuits, biasing resistor R51 applies a relatively large positive voltage to the non-inverting terminal of amplifier 64. With terminal G0' at a relatively small positive potential, amplifier 64 produces a positive output sufficient to turn on transistors Q10 and Q12. With transistor Q12 turned on capacitor C5 is rapidly discharged so that comparator 66 again produces a zero voltage signal with no further effect. The turning on of transistor Q10 turns off transistor Q11 by effectively connecting the negatively charged end of capacitor C4 to the base of transistor Q11 and its positively charged end to its emitter. Transistor Q11 remains off until the charge on capacitor C4 is reversed by charging current supplied by resistor R43. Therefore, transistor Q11 remains off for a time fixed by the RC time constant of resistor R43 and capacitor C4. After the charge on capacitor C4 is reversed resistor R43 can apply a bias current through the base-emitter junction of transistor Q11, turning it on. At this point the circuit of FIG. 8 has returned to the initial assumed condition and may receive another pulse pair on terminals G0 and G0' to repeat the cycle just described. The time relationships among cerain ones of the above signals are displayed in graphs of FIG. 10 wherein graphs 10a, 10b, 10c, and 10d represent the signal from points PT, terminals G0 and G1 and the voltage across capacitor C5, respectively. The abscissas of FIG. 10 represent angular displacement of the engine crankshaft measured in degrees in advance of TDC.

It is appreciated that the delay between the production of the timing signal at terminals G0 and G1 to the production of the pulse at terminal G2 corresponds to fixed angular displacement of the crankshaft of the engine. This means the delay is inversely proportional to engine speed, and directly proportional to its cycle time period. Referring to capacitor C5 and potential V7 it is apparent that the delay is equal to the product of the capacitance of capacitor C5 and potential V7 divided by the magnitude of current supplied by terminal 16. Since this latter current is proportional to engine speed the delay is inversely proportional to engine speed and directly proportional to its cycle time period.

Figure 9:
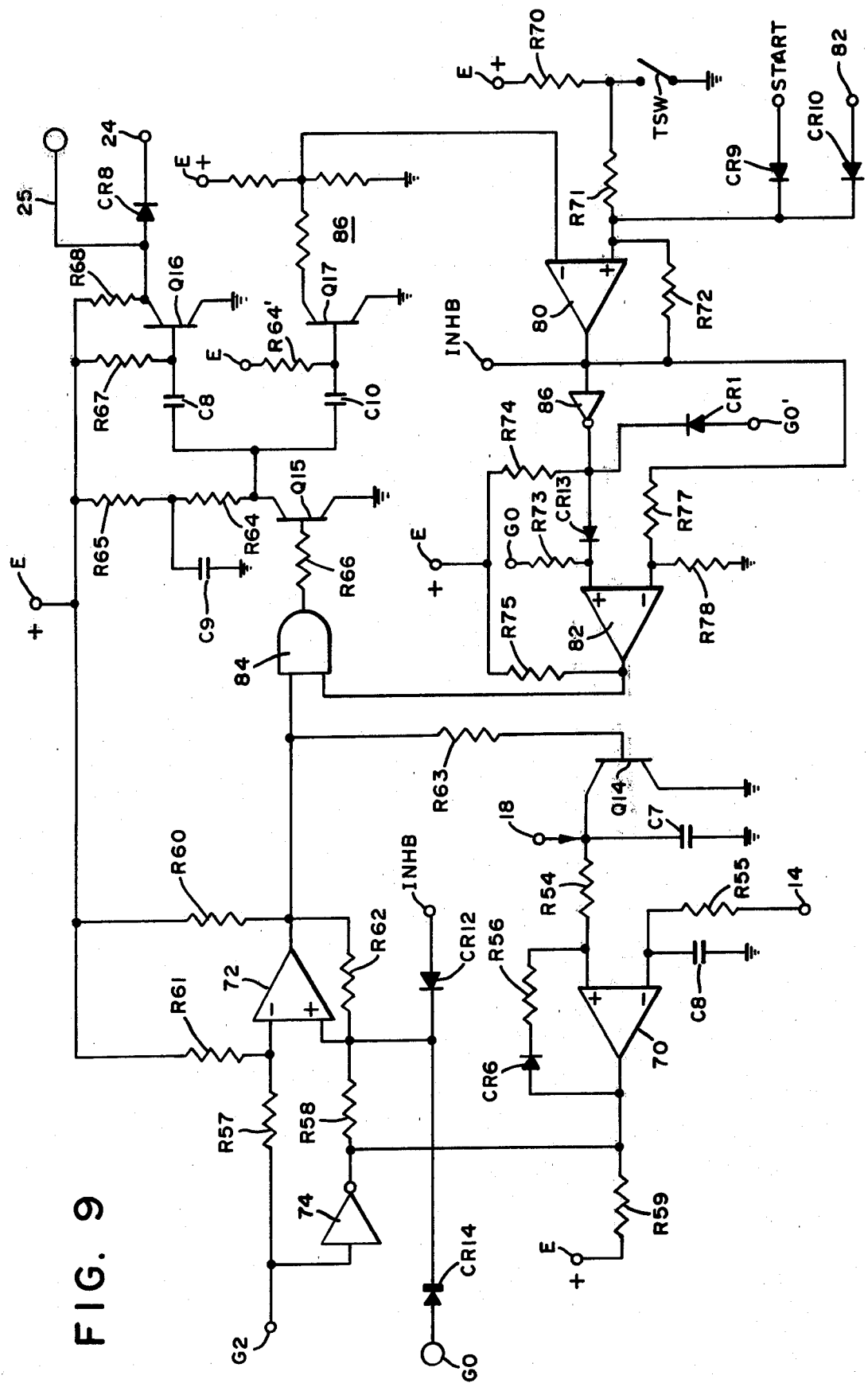
FIG. 9 is a more detailed schematic representation of the advance means of FIG. 1.

Referring to FIG. 9 details are given of an exemplary circuit for providing the functions associated with advance means TIM2 (FIG. 1). Employed herein is a converter means including a capacitive element C7 coupled to a comparator means 70. Charging of capacitive element C7 occurs over a time interval until comparator means 70 detects a charge exceeding a certain voltage level. This time conversion could be developed by alternate apparatus such as a voltage controlled oscillator driving a digital counter. Capacitive element C7 is charged by the signal supplied on terminal 18. This signal is supplied by the controlled current source previously described for FIG. 7. Therefore, capacitive element C7 is charged at a rate proportional to engine speed since the generator of FIG. 7 provides current proportional to engine speed. Capacitor C7 has one terminal grounded and the other coupled to the non-inverting terminal of comparator 70 through resistor R54. A control signal is provided by the control means previously described in FIGS. 4 and 5. Accordingly, terminal 14 herein is connected to terminal E0 of FIG. 4 or alternately to E0' of FIG. 5. Resistor R55 is connected between terminal 14 and the inverting terminal of comparator 70 which has a filtering capacitor C8 connected between it and ground. Comparator 70 has a degree of positive feedback supplied to it by serially connected diode CR6 and resistor R56. The anode of diode CR6 is connected to the output of comparator 70 so that a significant positive output therefrom forward biases diode CR6, providing hysterisis. An initiating signal from the delay means of FIG. 8 is provided on terminal G2 which is similarly identified in FIG. 8 and herein, coupled to R57 and its junction with R61 at the inverting input of amplifier 72. Transistor Q14 is controlled by amplifier 72 through biasing resistor R60 and resistor R63 connected to the base terminal of Q14. Inverter 74 has its input connected to terminal G2 and its output to one terminal of resistor R58, whose other terminal is connected to the non-inverting terminal of amplifier 72. The outputs of comparator 70 and inverter 74 are connected together and, because their output stages are of the open-collector type, are connected to biasing resistor R59. Biasing resistors R60 and R61 are connected to the output and inverting input of amplifier 72, respectively. The resistors associated with amplifier 72 are valued such that the production of a positive delay signal on terminal G2 produces a zero output from amplifier 72, and will maintain this zero output signal even though the signal at terminal G2 and the junction of comparator 70 and inverter 74 is approximately zero volts. Resistor R63 is connected between the output of amplifier 72 and the base of transistor Q14 whose emitter is grounded. Diode CR12 has its anode connected to terminal INHB and its cathode to the non-inverting terminal of amplifier 72. CR14 has its cathode connected to the non-inverting input of amplifier 72 and its anode connected to terminal G0. This connection insures that an ignition signal is generated in synchronism with G0 in the event the comparator 70 does not initiate the ignition pulse prior to the occurrence of G0.

A temperature sensing means is shown herein as a temperature responsive switch means TSW. Switch TSW is constructed using well-known bimetallic contacts capable of closing a circuit for engine temperatures less than a fixed amount. It is appreciated, however, that other temperature responsive devices can be employed such as a thermistor-controlled semiconductor switch. As an example, switch TSW may be open, at engine temperature below 90° F. Switch TSW has one of its terminals grounded and the other connected to the junction of biasing resistor R70 and one terminal of resistor R71. The other terminal of resistor R71 is connected to a holding means shown herein as holding amplifier 80 having a positive feedback means. The feedback means shown is a resistor R72 connected between the output and non-inverting input of amplifier 80. Also connected to this non-inverting input is resistor R71 as well as the cathodes of diodes CR9 and CR10 whose anodes are connected to terminals STRT and 82, respectively. With signals of a sufficiently small magnitude on its inputs, amplifier 80 can be driven by feedback resistor R72 to produce either its maximum or its minimum output signal. The maximum or minimum can be established by a temporary unbalancing of the inputs of amplifier 80. Therefore, amplifier 80 and feedback resistor R72 provide a holding function which may be provided by other equivalent circuits such as a flip-flop or a latching relay.

The output of amplifier 82 is connected to a gate means, herein shown as AND gate 84 having its inputs separately connected to the output of operational amplifier 82 and the output of amplifier 72. While a combination of analog and digital circuitry is illustrated one or the other type could be used exclusively. The signal on terminal INHB is coupled to the input of inverter 86 whose open collector output has connected between it and the inverting terminal of amplifier 82, a diode CR13 and resistor R73. The other end of R73 is connected to terminal G0. Biasing resistors R74 and R75 are connected to the output of inverter 86 and the output of amplifier 82, respectively. A voltage divider connected between terminal INHB and ground comprises serially connected resistors R77 and R78 whose junction is connected to the inverting terminal of amplifier 72.

Diode CR11 has its anode connected to terminal G0' and its cathode to terminal G0', and is poled so that a zero volt signal from inverter 86 effectively grounds terminal G0'.

Gate 84 drives an output means for providing an ignition pulse on terminal 24 and terminal 25, shown herein as capacitively coupled transistors Q15 and Q16 arranged to provide a fixed duration pulse. It is understood that a fixed duration pulse can be provided by other devices including a one-shot multivibrator. Furthermore, in some embodiments the duration of the ignition pulse may be variable. Resistor R66 is connected between the output of gate 84 and the base of transistor Q15. Its emitter is grounded and it has serially connected collector resistors R64 and R65 whose junction is connected to by-pass capacitor C9. Capacitor C8 is connected between the collector of transistor Q15 and the base of transistor Q16 which are both operating in the common emitter mode. Transistor Q16 has a biasing resistor R67 connected to its base and a collector resistor R68. Terminal 25 and the anode of CR8 are connected to the collector of transistor Q16. The cathode of CR8 is connected to terminal 24. A signal responsive to the ignition pulse is applied to the inverting terminal of amplifier 80 by transistor Q17 which has its base capacitively coupled to the collector of transistor Q15 by capacitor C10. Transistor Q17 has a bias resistor R64 connected to its base and resistance network 86 connected to its collector. Network 86 allows transistor Q17 to supply a voltage swing to the inverting terminal of amplifier 80 which is between 23 to 67% of the supply potential on terminal E.

In order to more fully understand the Apparatus of FIGS. 4–9, its operation will now be briefly discussed when engine ENG is both warm and in a running condition.

As shaft CS (FIG. 1) rotates to a position 15° before TDC, points PT (FIG. 6) close, causing transistor Q6 (FIG. 6) to turn on and transistor Q7 to turn off to simultaneously produce on terminals G0 and G0' positive pulses of fixed duration. These positive pulses are applied to inverter 67 and amplifier 64 (FIG. 8). As previously explained, capacitor C5 then charges at a rate proportional to engine speed as shown in graph 10d (FIG. 10). At this time the collector of transistor Q11 (FIG. 8) presents a short circuit so that terminal G2 (FIGS. 8 and 9) is at zero volts. It is assumed for now that amplifier 72 (FIG. 9) is producing a positive output which is held by feedback resistor R62. As a consequence transistor Q14 is turned on ensuring the full discharge of capacitor C7. As power shaft CS (FIG. 1) rotates, capacitor C5 (FIG. 8) charges until it exceeds potential V7. Potential V7 is set so that its potential is thus exceeded when power shaft CS has rotated through 45° while capacitor C5 (FIG. 8) was charging. As previously explained, a 45° displacement from 15° BTC of the preceeding cylinder corresponds to 60° before TDC of a succeeding cylinder. As already described transistor Q11 (FIG. 8) turns off in response. As a result the terminal G2 (FIGS. 8 and 9) is biased positively by resistor R61 (FIG. 9) as is the inverting input of amplifier 72. This signal is of a limited duration, as shown in graph 10e (FIG. 10). Since inverter 74 produces a zero volt signal in response to this positive signal the non-inverting terminal of amplifier 72 receives its signal as a result of feedback through RG2 from the output of amplifier 72, and signal 62 allows the inverting input of amplifier 72 to go to a large positive value. As a result, amplifier 72 produces a zero volt output which turns transistor Q14 off and allows capacitor C7 to charge. This zero volt signal is also coupled to AND gate 84 which produces a zero volt signal, turning off transistor Q15 and charging capacitors C8 and C10. Capacitor C7 is charged by current supplied by a controlled generator, such as shown in FIG. 7, which causes capacitor C7 (FIG. 9) to charge at a rate proportional to engine speed, as shown in graph 10f (FIG. 10). Accordingly, the charge on capacitor C7 represents displacement of shaft CS (FIG. 1). Capacitor C7 (FIG. 9) charges until it exceeds the control voltage at terminal 14, which is supplied from terminal E0' (FIG. 5), or alternatively from terminal E0 (FIG. 4). As previously explained, this control voltage decreases with increasing engine speed and manifold vacuum, thereby increasing the amount of advance.

The control voltage at terminal 14 (FIG. 9) corresponds to a displacement of powershaft CS during the interval when capacitor C7 is charging. Since it commenced charging when shaft CS was at 60° before TDC, the charge of capacitor C7 is referenced to this angular position. Upon the charge of capacitor C7 exceeding the potential at terminal 14, comparator 70 produces a positive signal that is applied to the non-inverting terminal of amplifier 72. In response amplifier 72 produces a positive signal as shown in graph 10g (FIG. 10). This positive signal is coupled through feedback resistor R62 (FIG. 9) to hold the amplifier in this condition (as was initially assumed). This positive signal also turns on transistor Q14, discharging capacitor C7 as shown in graph 10f (FIG. 10). This positive signal from amplifier 72 (FIG. 9) is also coupled to one input of AND gate 84. The other input of AND gate 84 is also positive unless the engine is cold or is starting as will be explained hereinafter. Therefore, AND gate 84 produces a positive signal which turns transistor Q15 on and transistors Q16 and Q17 off. Transistors Q16 and Q17 remain off until the respective charges on capacitors C8 and C9 is reversed by the associated biasing resistors. This produces an ignition pulse on terminal 24 and terminal 25 of a fixed duration as shown by the pulse illustrated in solid lines in graph 10h (FIG. 10). Regardless of the timing of the production of the ignition pulse, another timing pulse is produced by points PT (FIG. 6) at 15° before TDC and at each 90° interval of CS rotation. This initiates another cycle as just described. Additionally it will be noted that the minimum delay provided by this circuit is controlled by the duration of signal G2. Selecting the duration of signal G2, the advance angle may be decreased with speed to a value less than would be called for by the control signal on terminal 14. A minimum duration is required to charge C8 and C10.

In the cycle just described it was assumed that the engine was warm and not starting. Accordingly, switch TSW (FIG. 9) was closed and a zero volt signal applied to terminal STRT. Terminal 82 provides an auxiliary timing control which responds to manual controls or to the release of an accelerator pedal (not shown) or to a delay circuit which is actuated for a short interval after starting. It was assumed previously that the signal or terminal 82 was also at zero volts.

With all of these signals at zero volts the signal at the non-inverting terminal of amplifier 80 is always less than that on its inverting terminal. Accordingly, amplifier 80 produces a zero volt signal, causing inverter 86 to produce a positive signal due to the action of load resistor R74. This positive signal reverse biases CR11 and forward biases CR13 applying a positive voltage to the non-inverting input of amplifier 82 through the forward conduction of CR13. As a result, the output of amplifier 82 becomes positive due to the action of load resistor R75. The inverting input of amplifier 82 is held essentially at zero volts due to the connection of R78 to ground and the connection of R77 to terminal INHB (which is essentially at ground potential). This prevents pulse G0 from effecting the output of amplifier 82.

Assuming that engine ENG is warm but in the process of starting, a positive signal is applied to terminal STRT. This positive signal forward biases diode CR9 (FIG. 9) and drives the non-inverting terminal of amplifier 80 sufficiently positive to produce therefrom a positive signal on terminal INHB. This positive signal forward biases diode CR12 causing amplifier 72 to produce a positive signal thereby turning transistor Q14 on and discharging capacitor C7. The positive signal on terminal INHB also forward biases diode CR5 (FIG. 8) to produce a positive signal from amplifier 64 which turns transistor Q12 on and discharges capacitor C5. Diode CR1 (FIG. 5) is similarly forward biased, producing at terminal E0' its maximum positive voltage. Alternatively, if terminal E0 is used, CR1, CR2 and R25 are connected to the non-inverting input of amplifier 46. Under these circumsances, with both capacitors C5 (FIG. 8) and C7 (FIG. 9) discharged, the time conversions they produce cannot occur. Therefore, the input of AND gate 84 connected to amplifier 72 remains at a postive voltage. As powershaft CS (FIG. 1) rotates it arrives at a predetermined position at which points PT (FIG. 6) close to produce a positive signal at terminals G0 and G0', in a manner previously described and as illustrated in graph 10b (FIG. 10). This positive pulse G0 is applied through R73 (FIG. 9) to the non-inverting terminal of amplifier 82. Since also at this time inverter 86 inverts the signal on terminal INHB, CR13 is reversed biased allowing the non-inverting input of amplifier 82 to be affected by pulse G0 when it occurs. The positive voltage at the output of amplifier 80 is connected to terminal INHB and the input of inverter 86. The output of inverter 86 is connected to R77, which is serially connected to R78 and then to ground. The junction of R77 and R78 is connected to the inverting input of amplifier 82. The bias thus provided to the inverting input causes the output of amplifier 82 to go to zero volts. Upon the occurrence of pulse G0, the output of amplifier 82 goes positive, causing the output of gate 84 to also go positive. This generates an ignition pulse on terminal 24 and terminal INHB in a manner previously explained. The time relationships of the ignition pulses to signal G0 is shown by the dotted lines in FIG. 10h. If it were not for the action of the positive signal on terminal INHB, the timing signal on terminal G0 would produce its delayed ignition pulse (as shown by the solid lines in FIG. 10h) as well as the desired ignition pulse in time synchronism with G0. The pulses from AND gate 84 are also coupled to transistor Q17 which produces positive pulses that are applied to the inverting terminal of amplifier 80 with no further effect.

This process continues and supplies ignition pulses to terminal 24 and terminal 24 15° in advance of TDC while the engine is starting. Once the engine is started the positive potential on terminal STRT falls to zero. The output of amplifier 80, however, remains positive since it is self-held by resistor R72. Accordingly, capacitors C5 (FIG. 8) and C7 (FIG. 9) remain discharged since terminal INHB remains positive. As a result, the next occurring timing signal on terminal G0 causes a synchronous ignition pulse at terminal 24 and terminal 25 as it did when the engine was starting. This ignition pulse again causes a positive pulse at the inverting terminal of amplifier 80 whose width is of a much shorter duration than G0. However, with a zero volt signal at terminal STRT, the self-holding action of amplifier 80 is overcome so that it produces a zero volt signal at terminal INHB. In response, inverter 86 biases amplifier 82 so it continues to provide a positive voltage which is applied to AND gate 84, and prevents signal G0 from affecting the output of amplifier 82. With terminal INHB at zero volts diodes CR12 (FIG. 9) and CR5 (FIG. 8) are back biased. The back biasing of these diodes occurs before the timing signal on terminals G0 and G0' again fall to zero volts. Under these circumstances, the circuits of FIG. 4-9 operate in the manner previously described for a warm running engine with the operation of delay means being initiated by G0.

It is appreciated that the foregoing described the starting of an engine which was warm. Were it not warm, switch TSW (FIG. 9) would have remained open throughout. Accordingly, a positive voltage would remain on the non-inverting terminal of amplifier 80 just as though engine ENG were still being started. This condition would persist until engine ENG warmed to a point where switch TSW closed. At that time the ignition system would revert to the warm, running condition previously described.

Having thus described the invention in rather full detail, it will be understood that these details need not be strictly adhered to, but that further changes and modifications may suggest themselves to one skilled in the art, all falling within the scope of the present invention as defined by the subjoined claims.

We claim:

1. A system for controlling the timing of an internal combustion engine having a rotatable power shaft and an ignition pulse generating means producing a recurring ignition pulse, comprising:

timing means for producing a timing signal recurring at a timing rate proportional to the rotational speed of said power shaft, and at a predetermined rotational angle of said power shaft, temperature sensing means producing a signal indicative of the temperature of said engine over a temperature range, said temperature range having an upper limit and a lower limit and said temperature sensing means producing a heat signal proportional to the temperature within said range;

an advance means connected to said heat signal and said timing signal, said advance means including means for combining said timing signal and said heat signal to produce an ignition pulse, the rotational angle difference between said timing signal and has ignition pulse being proportional to the difference between said heat signal and one of said temperature range limits and wherein said advance means varies the rotational angle difference between said ignition pulse and said timing signal proportionally to the change in temperature of the engine relative to one of said temperature range limits;

load sensing means producing a load signal having a magnitude varying in response to the load upon said engine, said advance means including control means responsive to said load and heat signals for controlling the occurrence of said ignition pulse in response to load upon said engine and in response to temperature of said engine and speed sensing means producing a speed signal having a magnitude response to the rotational speed of said power shaft, said control means being operative to advance the occurrence of said ignition pulse in response to increased rotational speed of said power shaft, wherein said control means comprises a load clamp means having an output circuit and operable to translate said load signal to said output circuit and limit said load signal between a first and second voltage level, a voltage reference source, and a combining means for combining the output of said load clamp with said speed signal and said voltage reference to produce said control signal, said voltage reference having a magnitude such that upon starting of said engine, said control signal has a magnitude of at least that corresponding to production of said ignition pulse in synchronism with said timing signal, said clamp means comprising:

a first means for producing an output in response to said load signal, said first means biased to produce a limit output of a first magnitude upon said load signal signifying a load on said power shaft exceeding a first amount; and a second means driven by a first amplifier and biased for producing a limit output of a second magnitude in response to said first means producing an output signifying a load on said power shaft of less than a second amount, so that said second means produces a continuously varying signal in response to changes in the load upon said power shaft which are within a range of said first to said second amount and is limited outside.

2. A system according to claim 1 wherein said control means includes:

modulator means for reducing the sensitivity of said control means to changes of said load signal by a factor bearing a predetermined relation to the magnitude of said heat signal.

3. A system according to claim 1 wherein said advance means is operative to produce said ignition pulse in synchronism with said timing signal in response to the temperature of said engine.

4. A system according to claim 1 wherein said advance means includes:

delay means for producing a delay signal within a predetermined time interval after the occurrence of said timing signal, said ignition pulse being produced subsequent to said delay signal.

5. A system according to claim 4 wherein said predetermined time interval is inversely proportional to the rotational speed of said powershaft thereby corresponding to a fixed angular displacement of said powershaft, said delay signal corresponding in time to the earliest occurrence of said ignition pulse producible in response to said timing signal.

6. A system according to claim 1 wherein said control means combines said load, speed and heat signals to produce a control signal and wherein said advance means comprises:

converter means for producing a ramp signal having a magnitude linearly changing in time from a base value;

comparator means for producing an ignition pulse in response to said ramp signal exceeding in magnitude said control signal;

manually operable start switch being actuable to start said engine;

gate means coupled to said timing means and said comparator means for producing said ignition pulse in synchronism with said timing signal when said start switch is actuated and within a predetermined time period following an initiate pulse from said delay means when said start switch is unactuated; and reset means restoring the magnitude of said ramp signal to said base value in response to generation of said ignition pulse.

7. A system according to claim 1 wherein said combining means comprises:

a buffer means having an output circuit coupled to said load clamp means, said voltage reference source and said speed sensing means said buffer means producing an output responsive to the linear subtractive combination of the load upon and rotational speed of said powershaft.

8. A system according to claim 7 wherein said combining means further comprises a low speed sensing means including:

a threshold means responsive to said speed signal and biased to produce a given voltage upon the rotational speed of said powershaft falling below a given value; and an output circuit responsive to said threshold and buffer means for producing said control signal.

9. A system for controlling the timing of an internal combustion engine having a plurality of cylinders arranged in firing order and having a rotatable power shaft and an ignition pulse generating means producing recurring ignition pulses for said cylinders comprising:

a timing means producing a timing signal upon the power shaft rotating to a first predetermined angular position, start means for starting said engine, advance means responsive to said timing signal and to said start means, when activated for starting said engine, for producing an ignition pulse in response to said timing signal, prior to said power shaft rotating past a second predetermined angular position, said advance means including delay means, responsive to said start means when inactivated and to said timing signal for producing an ignition signal at a third predetermined angular position located subsequent to the rotation of said power shaft past said second predetermined angular position, and wherein said timing signal is produced prior to a first of said cylinders reaching top dead center, said second predetermined angular position being at or prior to the top dead center position of said first cylinder, and said third predetermined angular position is located subsequent to said top dead center position of said first cylinder and prior to the top dead center position of a second cylinder, said second cylinder being subsequent to said first cylinder in said firing order.

10. A system according to claim 9 wherein said advance means during the starting of said engine produces said ignition pulse within a given time interval after the production of said timing signal.

11. A system according to claim 9 wherein said start means includes a means responsive to an operating parameter of the engine and the operating parameter is temperature of said engine.

12. A system according to claim 11 further comprising:
   temperature sensing means, producing a heat signal responsive to the temperature of said engine, said advance means producing said ignition pulse within said given time interval after the production of said timing signal.

13. A system according to claim 9 wherein said advance means during the starting of said engine produces said ignition pulse in synchronism with said timing signal.

14. A system according to claim 9 wherein said timing signal is a periodic signal transferring from a first to a second value upon said powershaft rotating to said first predetermined angular position and wherein said system is responsive to transfer of said timing signal from said first to said second value during and subsequent to the starting of said engine.

15. A system according to claim 14 wherein said timing means comprises:
   circuit means for producing an output pulse of a fixed duration in response to said first powershaft rotating to said predetermined angular position.

16. A system according to claim 9 wherein said advance means comprises:
   delay means for producing a delay signal within a predetermined time interval after the production of said timing signal; and
   converter means for producing said ignition pulse in response to said delay signal.

17. A system according to claim 16 wherein the time interval from the production of said timing signal to the production of said delay signal increases in response to a decrease in the repetition rate of said timing signal.

18. A system according to claim 9 wherein said start means includes a start switch, actuation thereof operating said start means and starting said engine, said start switch being releasable upon the start of said engine, and wherein said gate means includes:
   holding means operating from the release of said start switch until after the next occurrence of said recurring ignition pulse to continue production of said ignition pulse within said given time interval, so that an ignition pulse is not missed when said start switch is actuated and released.

19. A system according to claim 18 wherein said holding means comprises:
   a hold amplifier having an input circuit coupled to said gate means and said start switch; and
   a positive feedback means coupled around said hold amplifier for applying to its input circuit a signal constructively adding to signals of said start switch and destructively combining with signals of said gate means.

20. A system according to claim 18 further comprising:
   temperature responsive switch means coupled to said holding means for causing it to produce said ignition pulses within said given time interval in response to the temperature of said engine being less than a fixed amount.

21. A system according to claim 9 wherein said advance means comprises:
   converter means producing a conversion signal changing at a rate proportional to the rotational speed of said powershaft;
   control means producing a control signal having a magnitude varying in response to said operating parameter;
   comparator means producing an ignition signal upon said conversion signal exceeding in magnitude said control signal; and
   gate means coupled to said comparator means and said timing means for producing said ignition pulse in synchronism with said timing signal when said engine is starting, subsequent to starting said ignition pulse being produced within a predetermined time period following an initiate pulse from said delay means.

22. A system according to claim 21 wherein said gate means comprises:
   an AND gate having one input coupled to said comparator means and another input coupled to said start means and timing means, said timing signal being gated by said AND gate during starting of said engine; and
   output means driven by said gate for producing an ignition pulse having a fixed duration.

23. A system according to claim 21 wherein said converter means comprises:
   a capacitive element;
   a speed sensing means producing a speed signal having a magnitude signifying the rotational speed of said powershaft; and
   a controlled current generator for charging said capacitive element with a current controlled by said speed signal.

24. A system according to claim 23 wherein said advance means comprises:
   delay means for producing in delayed response to said timing signal a delay signal, said delay signal occurring at a fixed angular displacement of said powershaft from said predetermined angular position, said delay signal corresponding in time to the earliest ignition pulse producible in response to said timing signal.

25. A system according to claim 24 wherein said converter means comprises:
   reset means responsive to said delay means for temporarily discharging said capacitive element in response to said delay signal.

26. A system according to claim 24 wherein said delay means comprises:
   a capacitor;
   a controlled current source for charging said capacitor with a current proportional to said speed signal; and
   a threshold device for producing said initiate pulse in response to the charge on said capacitor exceeding a fixed magnitude.

27. A system according to claim 21 further comprising:
   temperature sensing means for producing a heat signal responsive to the temperature of said engine; and
   load sensing means producing a load signal having a magnitude varying in response to the load upon said engine, said control means being responsive to said load and heat signals for advancing the occurrence of said ignition pulses in response to decreasing load upon said engine and in response to increasing temperature of said engine.

28. A system according to claim 27 wherein said control means includes:
   modulator means for reducing the sensitivity of said control means to changes for said load signal by a factor bearing a predetermined relation to the magnitude of said heat signal.

29. A system according to claim 28 further comprising:
   speed sensing means producing a speed signal having a magnitude responsive to the rotational speed of said powershaft, said control means being operative to advance the occurrence of said ignition pulse in response to increased rotational speed of said powershaft.

30. A system for controlling the timing of an internal combustion engine having a rotatable power shaft and an ignition pulse generating means producing a recurring ignition pulse, comprising:
   timing means for producing a timing signal recurring at a timing rate proportional to the rotational speed of said power shaft,
   temperature sensing means for producing a heat signal responsive to the temperature of said engine,
   advance means responsive to said heat signal and said timing signal for producing said ignition pulse at said timing rate,
   said advance means being operative to control the occurrence of said ignition pulse in response to temperature of said engine,
   load sensing means producing a load signal having a magnitude varying in response to the load upon said engine, said advance means including:
   control means responsive to said load and heat signals for controlling the occurrence of said ignition pulse in response to load upon said engine and in response to temperature of said engine,
   speed sensing means producing a speed signal having a magnitude responsive to the rotational speed of said power shaft, said control means being operative to advance the occurrence of said ignition pulse in response to increased rotational speed of said power shaft,
   said control means comprising a load clamp means having an output circuit and operable to translate said load signal to said output circuit and to limit said load signal between a first and second voltage level,
   a voltage reference source,
   a combining means for combining the output of said load clamp with said speed signal and said voltage reference to produce said control signal, said voltage reference having a magnitude such that upon starting of said engine said control signal has a magnitude of at least that corresponding to the production of said ignition pulse in synchronism with said timing signal,
   said load clamp comprises a first means for producing an output in response to said load signal, said first means bias to produce a limit output of a first magnitude upon said load signal signifying a load on said power shaft exceeding a first amount, and
   a second means driven by said first amplifier and biased for producing a limit output of a second magnitude in response to said first means producing an output signifying a load on said power shaft of less than a second amount, so that second means produces a continuously varying signal in response to changes in the load upon said power shaft which are within a range of said first to second amount and is limited outside.

31. The system according to claim 30 wherein said combining means comprises:
   a buffer having an output circuit coupled to said load clamp means, said voltage reference source and said speed sensing means, said buffer means producing an output responsive to the linear subtractive combination of the load upon and rotational speed of said power shaft.

32. The system according to claim 31 where said combining means further comprises a low speed sensing means including:
   a threshold means responsive to said speed signal and biased to produce a given voltage upon the rotational speed of said power shaft falling below a given value, and
   an output circuit responsive to said threshold and buffer means for producing said control signal.

33. A system for controlling the timing of an internal combustion engine having a rotatable power shaft and an ignition pulse generating means producing a recurring ignition pulse, said internal combustion engine having a plurality of cylinders and wherein said cylinders are fired successively according to a timing order and including a first cylinder N, said first cylinder N being fired successively to a second cylinder $N-1$, and prior to the firing of a third cylinder $N+1$ and where the cylinder firing order is at least cylinders $N-1$, N, and $N+1$, and comprising:
   a timing means to produce a timing signal upon said power shaft rotating to a first predetermined angular position between the top dead center positions of cylinders $N-1$ and N,
   start means for starting said engine and providing a start signal,
   advance means connected to said start signal and said timing signal for producing an ignition pulse in response to said timing signal at or before cylinder N reaches top dead center,
   said advance means including a delay means, said delay means being responsive to the absence of said start signal for preventing said advance means from producing said ignition signal until said power shaft rotates past an angular position corresponding to top dead center of cylinder N and is at an angular position at or before the top dead center of cylinder $N+1$ and whereby said delay prevents an ignition pulse from being generated in the absence of a start signal, and when the engine is running, until said power shaft has rotated to within a predetermined angular displacement from top dead center of the cylinder scheduled to receive said ignition pulse.

* * * * *